(12) United States Patent
Takashima et al.

(10) Patent No.: US 11,377,709 B2
(45) Date of Patent: Jul. 5, 2022

(54) HOT-PRESSED MEMBER AND METHOD FOR MANUFACTURING SAME, AND COLD-ROLLED STEEL SHEET FOR HOT PRESSING AND METHOD FOR MANUFACTURING SAME

(71) Applicant: JFE STEEL CORPORATION, Tokyo (JP)

(72) Inventors: Katsutoshi Takashima, Tokyo (JP); Takashi Kobayashi, Tokyo (JP); Yoshimasa Funakawa, Tokyo (JP); Seiji Nakajima, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 245 days.

(21) Appl. No.: 16/616,602

(22) PCT Filed: Mar. 30, 2018

(86) PCT No.: PCT/JP2018/013714
§ 371 (c)(1),
(2) Date: Nov. 25, 2019

(87) PCT Pub. No.: WO2019/003538
PCT Pub. Date: Jan. 3, 2019

(65) Prior Publication Data
US 2020/0172991 A1    Jun. 4, 2020

(30) Foreign Application Priority Data

Jun. 30, 2017   (WO) ................ PCT/JP2017/024255

(51) Int. Cl.
| | | |
|---|---|---|
| B32B 15/00 | (2006.01) | |
| C21D 9/46 | (2006.01) | |
| B21D 22/20 | (2006.01) | |
| B21K 29/00 | (2006.01) | |
| B32B 15/01 | (2006.01) | |
| C21D 1/18 | (2006.01) | |
| C21D 6/00 | (2006.01) | |
| C21D 8/02 | (2006.01) | |
| C22C 38/00 | (2006.01) | |
| C22C 38/02 | (2006.01) | |
| C22C 38/08 | (2006.01) | |
| C22C 38/16 | (2006.01) | |
| C22C 38/22 | (2006.01) | |
| C22C 38/26 | (2006.01) | |
| C22C 38/28 | (2006.01) | |
| C22C 38/32 | (2006.01) | |
| C22C 38/38 | (2006.01) | |
| C23C 2/06 | (2006.01) | |
| C23C 2/12 | (2006.01) | |

(Continued)

(52) U.S. Cl.
CPC ............... *C21D 9/46* (2013.01); *B21D 22/20* (2013.01); *B21K 29/00* (2013.01); *B32B 15/012* (2013.01); *B32B 15/013* (2013.01); *C21D 1/18* (2013.01); *C21D 6/001* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C22C 38/001* (2013.01); *C22C 38/002* (2013.01); *C22C 38/005* (2013.01); *C22C 38/008* (2013.01); *C22C 38/02* (2013.01); *C22C 38/08* (2013.01); *C22C 38/16* (2013.01); *C22C 38/22* (2013.01); *C22C 38/26* (2013.01); *C22C 38/28* (2013.01); *C22C 38/32* (2013.01); *C22C 38/38* (2013.01); *C23C 2/06* (2013.01); *C23C 2/12* (2013.01); *C23C 2/40* (2013.01); *C25D 3/22* (2013.01); *C25D 3/54* (2013.01); *C25D 3/565* (2013.01); *C21D 2211/001* (2013.01); *C21D 2211/004* (2013.01); *C21D 2211/005* (2013.01); *C21D 2211/008* (2013.01)

(58) Field of Classification Search
None
See application file for complete search history.

(56) References Cited

U.S. PATENT DOCUMENTS

| | | | |
|---|---|---|---|
| 8,241,759 B2 * | 8/2012 | Nakagaito ................ | C21D 9/46 428/659 |
| 9,255,313 B2 | 2/2016 | Cho et al. | |

(Continued)

FOREIGN PATENT DOCUMENTS

| | | |
|---|---|---|
| CN | 101316942 A | 12/2008 |
| CN | 102939399 A | 2/2013 |

(Continued)

OTHER PUBLICATIONS

Dec. 25, 2020, Office Action issued by the China National Intellectual Property Administration in the corresponding Chinese Patent Application No. 201880042686.7 with English language search report.

(Continued)

*Primary Examiner* — Seth Dumbris
(74) *Attorney, Agent, or Firm* — Kenja IP Law PC

(57) ABSTRACT

Disclosed is a hot-pressed member that can exhibit very high tensile strength after hot pressing, excellent delayed fracture resistance, and high tensile shear stress after resistance spot welding by properly adjusting its chemical composition and its microstructure such that at least 20 Nb-based precipitates having a grain size of less than 0.10 μm are present on average per 100 μm$^2$ of a cross section parallel to a thickness direction of the member, a prior austenite average grain size is 8 μm or less, an average aspect ratio of prior austenite grains is 2.5 or less, and a volume fraction of martensite is 90% or more, and such that a standard deviation of Vickers hardness measured every 200 μm on a surface of the member is 40 or less.

12 Claims, No Drawings

(51) Int. Cl.
*C23C 2/40* (2006.01)
*C25D 3/22* (2006.01)
*C25D 3/54* (2006.01)
*C25D 3/56* (2006.01)

(56) References Cited

U.S. PATENT DOCUMENTS

| | | | |
|---|---|---|---|
| 9,970,073 B2* | 5/2018 | Kawano | C23C 2/28 |
| 10,174,396 B2 | 1/2019 | Takashima et al. | |
| 11,085,101 B2 | 8/2021 | Takashima et al. | |
| 11,111,558 B2 | 9/2021 | Takashima et al. | |
| 11,136,643 B2* | 10/2021 | Takashima | C22C 38/04 |
| 2009/0238715 A1 | 9/2009 | Cho et al. | |
| 2013/0095347 A1 | 4/2013 | Kawasaki et al. | |
| 2014/0290807 A1* | 10/2014 | Goto | C22C 38/06 |
| | | | 148/506 |
| 2015/0050519 A1 | 2/2015 | Nonaka et al. | |
| 2016/0222483 A1 | 8/2016 | Murakami et al. | |
| 2016/0369369 A1 | 12/2016 | Takashima et al. | |
| 2018/0044751 A1 | 2/2018 | Takashima et al. | |

FOREIGN PATENT DOCUMENTS

| | | |
|---|---|---|
| CN | 103725961 A | 4/2014 |
| CN | 105940134 A | 9/2016 |
| CN | 107250406 A | 10/2017 |
| EP | 2581465 A1 | 4/2013 |
| EP | 2803746 A1 | 11/2014 |
| JP | 2008308732 A | 12/2008 |
| JP | 2013122076 A | 6/2013 |
| JP | 2014015638 A | 1/2014 |
| JP | 2014122398 A | 7/2014 |
| JP | 2015113500 A | 6/2015 |
| WO | 2011158818 A1 | 12/2011 |
| WO | 2013105631 A1 | 7/2013 |

OTHER PUBLICATIONS

Kuaishe Wang et al., Metal Coating Technology, Sep. 30, 2014, Metallurgical Industry Press.
Mar. 9, 2020, the Extended European Search Report issued by the European Patent Office in the corresponding European Patent Application No. 18825319.9.
Apr. 26, 2021, Office Action issued by the China National Intellectual Property Administration in the corresponding Chinese Patent Application No. 201880042686.7 with English language concise statement of relevance.
Jun. 26, 2018, International Search Report issued in the International Patent Application No. PCT/JP2018/013714.

* cited by examiner

HOT-PRESSED MEMBER AND METHOD FOR MANUFACTURING SAME, AND COLD-ROLLED STEEL SHEET FOR HOT PRESSING AND METHOD FOR MANUFACTURING SAME

BACKGROUND

The present disclosure relates to a hot-pressed member and a method for manufacturing the same, and a cold-rolled steel sheet for hot pressing and a method for manufacturing the same, and particularly to the improvement of delayed fracture resistance and resistance spot weldability of a hot-pressed member.

As used herein, the term "hot-pressed member" refers to a member obtained by hot press forming a cold-rolled steel sheet having quench hardenability to increase its strength.

In addition, examples of the cold-rolled steel sheet disclosed herein include not only general cold-rolled steel sheets, but also hot-dip galvanized cold-rolled steel sheets (including galvannealed cold-rolled steel sheets), electrogalvanized cold-rolled steel sheets (including zinc-nickel alloy-electroplated cold-rolled steel sheets), and aluminum-coated or aluminum-plated cold-rolled steel sheets.

BACKGROUND

In recent years, $CO_2$ emission regulations have become more stringent due to rising environmental problems, and in the automobile field, weight reduction of vehicle bodies has become an issue for reduced fuel consumption. To this end, sheet metal thinning by application of high-strength steel sheets to automobile parts is advanced, and application of steel sheets with tensile strength (TS) of 1780 MPa or more is considered.

High-strength steel sheets used for structural members and reinforcing members of automobiles are required to have excellent formability. However, in a steel sheet with TS of 1780 MPa or more, cracking would occur during cold press forming due to low ductility and large spring back would occur due to high yield strength. Therefore, after cold press forming, high dimension accuracy can not be obtained. In addition, since residual stress remains in the steel sheet after cold press forming, delayed fracture (hydrogen embrittlement) may be caused by hydrogen intruding from the use environment.

Under such circumstances, as a method for obtaining high strength, recently, press forming by hot pressing (also referred to as hot stamping, die quenching, press quenching, and so on) has been focused. Hot pressing is a forming method that enables forming with high dimensional accuracy by heating a steel sheet to the temperature range of austenite single phase and then forming (processing) the steel sheet at the high temperature, and that enables increase of the strength through quenching by cooling the steel sheet after the forming. Moreover, in this hot pressing, since the residual stress after press forming is reduced as compared with cold pressing, the delayed fracture resistance is also improved.

However, although many automobile assembly processes are accomplished by resistance spot welding, stress is also applied to the members after being subjected to hot pressing in order to maintain the rigidity of the entire automobile body. Thus, the concern of delayed fracture after press forming can not be ruled out. Therefore, it is necessary to improve the delayed fracture resistance of the member after being subjected to hot pressing.

Moreover, in order to guarantee a tensile strength of 1780 MPa or more, it is necessary to contain a large amount of alloying elements (such as C), which, however, leads to a significant reduction in the tensile shear strength (TSS) of a joint after resistance spot welding.

Conventionally, several means for improving delayed fracture resistance after hot pressing have been reported. For example, JP2015-113500A (PTL 1) describes a technique for improving delayed fracture resistance by controlling the amount of precipitation of alloy carbonitrides or cementite.

In addition, JP2014-122398A (Patent Document 2) describes a technique for improving delayed fracture resistance by enabling formation of retained austenite after hot pressing.

Moreover, JP2008-308732A (Patent Document 3) describes adding Nd as a technique for improving the tensile shear strength of a joint after resistance spot welding.

CITATION LIST

Patent Literature

PTL 1: JP2015-113500A
PTL 2: JP2014-122398A
PTL 3: JP2008-308732A

SUMMARY

Technical Problem

However, the Ti-based carbides described in PTL 1 are insufficient for achieving the reduction of the prior austenite grain size, or for serving as a hydrogen trapping site. Thus, it can not be said that these carbides have sufficient delayed fracture resistance. Furthermore, it can not be said that the tensile shear strength after resistance spot welding is secured.

In the technique of PTL 2, retained austenite can be a hydrogen trapping site, yet if retained austenite having a high C concentration is present, the hardness distribution becomes broader in the heat-affected zone (HAZ) after resistance spot welding, and the tensile shear strength decreases.

In the technique of PTL 3, although the tensile shear strength is improved by the addition of Nd, Nd-based inclusions are formed, and a crack occurs in the vicinity of the inclusions upon hydrogen entry, leading to deterioration of delayed fracture resistance and increased cost.

As described above, it is considered difficult to improve both the delayed fracture resistance of a hot-pressed member with TS of 1780 MPa or more and the tensile shear stress after resistance spot welding, and a hot-pressed member showing improvement in both of these properties has not been developed.

Solution to Problem

Therefore, as a result of intensive investigations in view of the above situation, the present inventors discovered that in order to improve both the delayed fracture resistance of a hot-pressed member and the tensile shear strength after resistance spot welding, it is effective to, as the microstructure of the member, cause fine Nb-based precipitates to disperse on the surface layer of the member, and to control the hardness distribution on the surface of the member, thereby achieving both excellent delayed fracture resistance and improved tensile shear stress after resistance spot welding.

Specifically, dispersing fine Nb-based precipitates makes it possible to reduce the average prior austenite grain size and to cause Nb-based precipitates to serve as hydrogen trapping sites, thereby improving the delayed fracture resistance.

In addition, since Nb-based precipitates enable refinement of the microstructure in the heat-affected zone (HAZ) even after a temperature rise resulting from resistance spot welding, with the result that the toughness against the shear stress applied to a nugget end can be improved, and thus the tensile shear stress can be increased.

Furthermore, when the variation in hardness becomes large, that is, segregation of Mn is present in the surface of the cold-rolled steel sheet as the raw material, the presence of martensite after hot pressing changes, and the martensitic transformation start temperature (Ms temperature) changes in the steel sheet depending on the distribution of Mn. In other words, when the amount of Mn is large, the Ms temperature decreases, and when the amount of Mn is small, the Ms temperature increases. When the Ms temperature is low, fresh martensite with few carbides is formed, while when the Ms temperature is high, tempered martensite is formed in which carbides are formed after martensitic transformation. Furthermore, this microscopic difference in Mn causes a change in the hydrogen overpotential, and thus a change in the hydrogen generation reaction, thereby affecting the delayed fracture characteristics. That is, upon entry of hydrogen, cracks are generated originating from the interface between the fresh martensite and the tempered martensite or from the fresh martensite. Accordingly, the inventors discovered that reducing Mn segregation on the surface of a cold-rolled steel sheet as the raw material as well as on the surface of the pressed member is also effective in improving the delayed fracture characteristics. The present disclosure was completed based on the above discoveries.

Specifically, primary features of the present disclosure are as follows. 1. A hot-pressed member comprising: a steel chemical composition containing (consisting of), by mass %, C: 0.28% or more and less than 0.42%, Si: 1.5% or less, Mn: 1.1% or more and 2.4% or less, P: 0.05% or less, S: 0.005% or less, Al: 0.01% or more and 0.50% or less, N: 0.010% or less, and Nb: 0.005% or more and 0.15% or less, with the balance being Fe and inevitable impurities; a microstructure in which a prior austenite average grain size is 8 μm or less, an average aspect ratio of prior austenite grains is 2.5 or less, a volume fraction of martensite is 90% or more, and at least 20 Nb-based precipitates having a grain size of less than 0.10 μm are present on average per 100 μm$^2$ of a cross section parallel to a thickness direction of the member; a standard deviation of Vickers hardness measured every 200 μm on a surface of the member of 40 or less; and a tensile strength of 1780 MPa or more.

2. The hot-pressed member according to 1., wherein the steel chemical composition further contains, by mass %, at least one selected from the group consisting of Ti: 0.15% or less, B: 0.0050% or less, Mo: 0.50% or less, Cr: 0.50% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

3. The hot-pressed member according to 1. or 2., comprising, on a surface layer thereof, an Al or Al alloy coating or plating layer or a Zn or Zn alloy coating or plating layer.

4. A cold-rolled steel sheet for hot pressing, comprising: a chemical composition containing (consisting of), by mass %, C: 0.28% or more and less than 0.42%, Si: 1.5% or less, Mn: 1.1% or more and 2.4% or less, P: 0.05% or less, S: 0.005% or less, Al: 0.01% or more and 0.50% or less, N: 0.010% or less, and Nb: 0.005% or more and 0.15% or less, with the balance being Fe and inevitable impurities; a microstructure which contains 5% or more by volume fraction of martensite having an average aspect ratio of 3.0 or less and an average grain size of 3 μm or less, and at least 30 Nb-based precipitates having a grain size of less than 0.10 μm present on average per 100 μm$^2$ of a cross section parallel to a thickness direction of the steel sheet; and a standard deviation of Vickers hardness measured every 200 μm on a surface of the steel sheet of 35 or less.

5. The cold-rolled steel sheet for hot pressing according to 4., wherein the chemical composition further contains, by mass %, at least one selected from Ti: 0.15% or less, B: 0.0050% or less, Mo: 0.50% or less, Cr: 0.50% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

6. The cold-rolled steel sheet for hot pressing according to 4. or 5., wherein the steel sheet comprises on a surface thereof an Al or Al alloy coating or plating layer or a Zn or Zn alloy coating or plating layer.

7. A method for manufacturing the cold-rolled steel sheet for hot pressing as recited in 4., the method comprising: preparing a steel raw material comprising a chemical composition containing (consisting of), by mass %, C: 0.28% or more and less than 0.42%, Si: 1.5% or less, Mn: 1.1% or more and 2.4% or less, P: 0.05% or less, S: 0.005% or less, Al: 0.01% or more and 0.50% or less, N: 0.010% or less, and Nb: 0.005% or more and 0.15% or less, with the balance being Fe and inevitable impurities; hot rolling the steel raw material to obtain a hot-rolled steel sheet under a set of conditions including a rolling reduction of 12% or more at a final pass of finish rolling, a rolling reduction of 15% or more at a pass immediately before the final pass, and a finisher delivery temperature of 860° C. to 950° C.; after the hot rolling, subjecting the hot-rolled steel sheet to primary cooling whereby the hot-rolled steel sheet is cooled to a cooling end temperature of 700° C. or lower at a first average cooling rate of 70° C./s or higher up to the cooling end temperature; after the primary cooling, subjecting the steel sheet to secondary cooling whereby the steel sheet is coiled at a coiling temperature of 520° C. or lower at a second average cooling rate of 5° C./s to 50° C./s up to the coiling temperature; then pickling the coiled hot-rolled steel sheet, and then subjecting the steel sheet to a first heat treatment whereby the steel sheet is heated to a temperature range of 400° C. to 700° C.; then cold rolling the steel sheet to obtain a cold-rolled steel sheet, then subjecting the cold-rolled steel sheet to a second heat treatment whereby the cold-rolled steel sheet is heated to a temperature range of 720° C. to 850° C. at an average heating rate of 5° C./s to 20° C./s and subjected to 15 seconds to 600 seconds of soaking in the temperature range of 720° C. to 850° C.; and after the soaking, subjecting the cold-rolled steel sheet to a tertiary cooling whereby the cold-rolled steel sheet is cooled to a cooling end temperature of 600° C. or lower at a third average cooling rate of 5° C./s or higher.

8. The method according to 7. for manufacturing the cold-rolled steel sheet for hot pressing as recited in 5., wherein the chemical composition further contains, by mass %, at least one selected from the group consisting of Ti: 0.15% or less, B: 0.0050% or less, Mo: 0.50% or less, Cr: 0.50% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

9. The method according to 7. or 8. for manufacturing the cold-rolled steel sheet for hot pressing as recited in 6., the method further comprising: after the tertiary cooling, applying an Al or Al alloy coating or plating treatment or a Zn or Zn alloy coating or plating treatment to a surface of the cold-rolled steel sheet.

10. A method for manufacturing a hot-pressed member, comprising: heating the cold-rolled steel sheet for hot pressing as recited in any one of 4. to 6. in a temperature range of an $Ac_3$ transformation temperature to 1000° C.; and then hot pressing the steel sheet.

Advantageous Effect

According to the present disclosure, it is possible to obtain a hot-pressed member which has extremely high tensile strength after hot pressing and also has excellent delayed fracture resistance and high tensile shear stress after resistance spot welding. For example, it is possible to stably obtain a hot-pressed member which is excellent in delayed fracture resistance and in tensile shear stress after resistance spot welding, and which has a tensile strength of 1780 MPa or more, in which no cracking occurs even after immersion in hydrochloric acid, and which has a tensile shear stress after resistance spot welding of 9 kN or more, preferably 11 kN or more. Further, according to the present disclosure, it is possible to obtain a hot-pressed member with stable properties even under hot pressing conditions with large variations at the time of heating.

DETAILED DESCRIPTION

The following provides the details of the present disclosure. First, the microstructures of the hot-pressed member and the cold-rolled steel sheet for hot pressing according to the present disclosure will be described in detail.
[Microstructure of Hot-Pressed Member]
The microstructure of the hot-pressed member is a microstructure such that a prior austenite average grain size is 8 μm or less, an average aspect ratio of prior austenite grains is 2.5 or less, a volume fraction of martensite is 90% or more, and at least 20 Nb-based precipitates having a grain size of less than 0.10 μm are present on average per 100 μm² of a cross section parallel to a thickness direction of the member, and a standard deviation of Vickers hardness measured every 200 μm on a surface of the member is 40 or less.

When the prior austenite average grain size is more than 8 μm, the delayed fracture resistance is deteriorated. Therefore, an upper limit is 8 μm. It is preferably 7 μm or less, and more preferably 6.5 μm or less.

In addition, when the average aspect ratio of prior austenite crystal grains exceeds 2.5, not only the delayed fracture resistance is degraded, but also segregation of P and S becomes remarkable in the heat-affected zone (HAZ) after resistance spot welding, resulting in lower tensile shear stress. Therefore, the average aspect ratio of prior austenite grains is 2.5 or less. Preferably, it is 2.0 or less.

In addition, when the volume fraction of martensite is less than 90%, it is difficult to achieve a tensile strength of 1780 MPa or more. Therefore, the volume fraction of martensite is 90% or more. It is preferably 93% or more, and more preferably 95% or more. It may be 100%.

In a cross section parallel to the thickness direction of the member after being subjected to hot pressing, it is necessary to contain at least 20, preferably at least 30, Nb-based precipitates having a grain size of less than 0.10 μm present on average per 100 μm². Such fine Nb-based precipitates serve as hydrogen trapping sites and improve delayed fracture resistance, and effectively contribute to the refinement of crystal grains in HAZ after resistance spot welding, resulting in improved tensile shear stress. On the other hand, if the grain size of Nb-based precipitates is more than 0.10 μm, or if the number of Nb-based precipitates is less than 20 on average even when the grain size thereof is less than 0.10 μm, the delayed fracture resistance and the tensile shear stress after resistance spot welding are degraded. Here, examples of the Nb-based precipitates include NbC, NbN, and Nb(C,N). The cross section parallel to the thickness direction of the member to be measured is not particularly limited, and may be taken at any position.

Moreover, the standard deviation of Vickers hardness measured every 200 μm on the surface of the member after being subjected to hot pressing is 40 or less. This standard deviation mainly suggests the Mn band, and when it exceeds 40, the delayed fracture resistance deteriorates. Therefore, the standard deviation is 40 or less. Preferably, it is 35 or less.

[Microstructure of Cold-Rolled Steel Sheet for Hot Pressing]

In order to obtain desired properties as a hot pressed member, it is important to control the microstructure of the cold-rolled steel sheet for hot pressing. That is, the microstructure of the cold-rolled steel sheet for hot pressing is a microstructure which contains 5% or more by volume fraction of martensite having an average aspect ratio of 3.0 or less and an average grain size of 3 μm or less, and at least 30 Nb-based precipitates having a grain size of less than 0.10 μm present on average per 100 μm² of a cross section parallel to a thickness direction of the steel sheet, and furthermore, a standard deviation of Vickers hardness measured every 200 μm on the surface of the steel sheet after being subjected to hot pressing is 35 or less.

In the cold-rolled steel sheet for hot pressing, when the average aspect ratio of martensite exceeds 3.0, the distribution of Mn in austenite becomes uneven due to reverse transformation during hot pressing, and the standard deviation of Vickers hardness measured every 200 μm on the surface of the member after being subjected to hot pressing exceeds 40, leading to deterioration of the delayed fracture resistance. Also, even if the average grain size of martensite exceeds 3 μm, the distribution of Mn at the time of reverse transformation also becomes uneven, and the standard deviation of Vickers hardness measured every 200 μm on the surface of the member after being subjected to hot pressing exceeds 40, causing the delayed fracture resistance to degrade. Furthermore, if the volume fraction of martensite is less than 5%, Mn disperses unevenly before hot pressing, and, again, the standard deviation of Vickers hardness measured every 200 μm on the surface of the member after being subjected to hot pressing exceeds 40, resulting in lower delayed fracture resistance. A preferred upper limit of the volume fraction of martensite is 70%. The reason is that if the volume fraction of martensite exceeds 70%, the distribution of C and Mn during reverse transformation becomes uneven, and the delayed fracture resistance is degraded.

In addition, since some Nb-based precipitates are coarsened by hot pressing, if the number of Nb-based precipitates having a grain size of less than 0.10 μm is less than 30 per 100 μm$^2$ on average in a cross section parallel to the thickness direction of the cold-rolled steel sheet, the desired dispersion of Nb-based precipitates can not be obtained after hot pressing, and the tensile shear stress after resistance spot welding may be lowered. Furthermore, since the functionality of such Nb-based precipitates as hydrogen trapping sites is degraded, the delayed fracture resistance is also lowered. Therefore, in the cold-rolled steel sheet before being subjected to hot pressing, at least 30, preferably at least 35, Nb-based precipitates having a grain size of less than 0.10 μm are present on average per 100 μm$^2$ of a cross section parallel to the thickness direction of the steel sheet. In addition, no particular limitation is placed on the cross section parallel to the thickness direction of the steel sheet to be measured, and a so-called C or L cross section may be used.

Moreover, in the cold-rolled steel sheet for hot pressing, the standard deviation of Vickers hardness measured every 200 μm on the surface of the steel sheet is 35 or less. The reason is that if the standard deviation exceeds 35, the standard deviation of Vickers hardness measured every 200 μm on the surface of the member after being subjected to hot pressing exceeds 40, and the delayed fracture resistance is deteriorated.

Furthermore, in order to obtain the desired prior austenite grain size after hot pressing, it is preferable that the microstructure of the cold-rolled steel sheet before being subjected to hot pressing contains 20% or more by volume fraction of ferrite having an average aspect ratio of 3.0 or less and an average grain size of 7 μm or less. A preferred upper limit of this volume fraction is 80%. The reason is that C and Mn are concentrated in hard phases other than ferrite, and a desired prior austenite grain size can not be obtained after hot pressing.

In the cold-rolled steel sheet for hot pressing, the requirement that the volume fraction of martensite having an average aspect ratio of 3.0 or less and an average grain size of 3 μm or less be 5% or more is mainly satisfied by a second annealing step (the second heat treatment step and the subsequent cooling step) in the process of manufacturing the cold-rolled steel sheet described later. In addition, the requirement that at least 30 Nb-based precipitates having a grain size of less than 0.10 μm be present on average per 100 μm$^2$ of the cross section parallel to the thickness direction of the steel sheet is mainly satisfied by a hot rolling step (including the subsequent cooling step) and two annealing steps (the first heat treatment step as well as the second heat treatment step and the subsequent cooling step). Moreover, the requirement that the standard deviation of Vickers hardness measured every 200 μm on the surface of the steel sheet be 35 or less is mainly satisfied by a hot rolling step (including the subsequent cooling step) and two annealing steps (a first heat treatment step as well as a second heat treatment step and the subsequent cooling step).

Next, appropriate compositional ranges of the hot-pressed member and the cold-rolled steel sheet for hot pressing according to the present disclosure will be described. When components are expressed in "%", this refers to "mass %".

C: 0.28% or more and less than 0.42%

C is an element effective for increasing the strength of the steel, and is an important element for strengthening martensite after hot pressing to increase the strength of the steel. However, if the C content is less than 0.28%, the hardness of martensite after hot pressing is insufficient, and a tensile strength of 1780 MPa or more can not be obtained. The C content is preferably 0.30% or more. On the other hand, when C is added by 0.42% or more, the hardness after resistance spot welding increases, the toughness decreases, and the tensile shear stress decreases. Therefore, the C content is less than 0.40%. Preferably, it is less than 0.39%.

Si: 1.5% or Less

Si is an element effective for solid solution strengthening of ferrite and increasing the strength. However, excessive addition of Si lowers the toughness at the time of resistance spot welding and deteriorates the tensile shear stress. Therefore, the Si content is 1.5% or less. It is preferably 0.5% or less, and more preferably 0.4% or less. Although the lower limit of the Si content is not particularly specified, it is preferable to set it at 0.005% because making the Si content extremely low leads to an increase in cost.

Mn: 1.1% or More and 2.4% or Less

Mn is an element that increases the quench hardenability during hot pressing, and thus contributes to the formation of martensite after hot pressing, that is, the increase in strength. To obtain this effect, the Mn content needs to be 1.1% or more. Preferably, it is 1.3% or more. However, when Mn is excessively added, the Mn band is excessively generated, and the hardness of the surface varies greatly. Therefore, the Mn content is 2.4% or less. Preferably, it is 2.2% or less.

P: 0.05% or Less

P contributes to the increase in strength by solid solution strengthening. However, when added excessively, segregation of P at grain boundaries becomes remarkable, the grain boundaries are embrittled, and the tensile shear stress after resistance spot welding is lowered. Therefore, the P content is 0.05% or less. Preferably, it is 0.04% or less. Although the lower limit of the P content is not particularly specified, it is preferable to set it at 0.0005% because making the P content extremely low leads to an increase in steelmaking cost.

S: 0.005% or Less

When the S content is high, a large amount of sulfides such as MnS is formed, and inclusions serve as a starting point of cracking upon entry of hydrogen, causing deterioration of the delayed fracture resistance. Therefore, an upper limit of the S content is 0.005%. Preferably, it is 0.0045% or less. Although the lower limit of the S content is not particularly specified, it is preferable to set it at 0.0002% because, as is the case with P, making the S content extremely low leads to an increase in steelmaking cost.

Al: 0.01% or More and 0.50% or Less

Al is an element necessary for deoxidation. To obtain this effect, the Al content needs to be 0.01% or more. On the other hand, adding Al beyond 0.50% does not increase this effect. Therefore, the Al content is 0.50% or less. Preferably, it is 0.40% or less.

N: 0.010% or Less

Since N forms a coarse nitride and degrades the delayed fracture resistance, it is necessary to suppress the content. In particular, when the N content exceeds 0.010%, this tendency becomes remarkable. Therefore, the N content is 0.010% or less. Preferably, it is 0.008% or less.

Nb: 0.005% or More and 0.15% or Less

Nb is an element that contributes to the increase in strength by forming fine carbonitrides. Furthermore, in the present disclosure, since fine Nb-based precipitates not only provide hydrogen trapping sites but also refine the austenite grain size during hot pressing, Nb is considered as an element that contributes to the improvement of the delayed fracture resistance and the tensile shear stress after resistance spot welding. To obtain this effect, the Nb content needs to be 0.005% or more. Preferably, it is 0.010% or more. On the other hand, adding a large amount of Nb fails to further increase the above effect, but instead increases the cost. Therefore, the Nb content is 0.15% or less. It is preferably 0.12% or less, and more preferably 0.10% or less.

Moreover, in the present disclosure, the following components may be appropriately contained.

Ti: 0.15% or Less

Ti is an element that contributes to the increase in strength by forming a fine carbonitride. Furthermore, when B is added as described later, Ti is also necessary to prevent B from reacting with N. To obtain this effect, the Ti content is preferably 0.005% or more. On the other hand, when a large amount of Ti is added, the elongation after hot pressing is significantly reduced. Therefore, the Ti content is preferably 0.15% or less. More preferably, it is 0.10% or less.

B: 0.0050% or Less

B is an element that increases the quench hardenability during hot pressing, and thus contributes to the formation of martensite after hot pressing, that is, the increase in strength. B also improves the grain boundary strength by segregation at grain boundaries, it is effective for increasing the delayed fracture resistance. To obtain this effect, the B content is preferably 0.0002% or more. However, it is preferable that the B content be 0.0050% or less, because excessive addition of B deteriorates toughness and reduces tensile shear stress after resistance spot welding. The B content is more preferably 0.0040% or less, and still more preferably 0.0035% or less.

Mo: 0.50% or Less

Mo is an element that increases the quench hardenability during hot pressing, and thus contributes to the formation of martensite after hot pressing, that is, the increase in strength. To obtain this effect, the Mo content is preferably 0.005% or more. It is more preferably 0.01% or more. On the other hand, even if a large amount of Mo is added, the above effect is saturated, leading to an increase in cost, and causing deterioration of the chemical conversion treatment property. Therefore, the Mo content is preferably 0.50% or less. It is more preferably 0.35% or less.

Cr: 0.50% or Less

Cr, like Mo, is an element that increases the quench hardenability during hot pressing, and thus contributes to the formation of martensite after hot pressing, that is, the increase in strength. To obtain this effect, the Cr content is preferably 0.005% or more. It is more preferably 0.01% or more. On the other hand, even if a large amount of Cr is added, the above effect is saturated, and a surface oxide is formed, deteriorating the coatability. Therefore, the Cr content is preferably 0.50% or less. It is more preferably 0.35% or less.

Sb: 0.001% or More and 0.020% or Less

Sb has the effect of suppressing the formation of a decarburized layer in a surface layer part of a steel sheet before heating of the steel sheet prior to hot pressing and subsequent cooling through a series of processes of hot pressing. Accordingly, the hardness distribution of the sheet surface becomes uniform, and the delayed fracture resistance is improved. To obtain this effect, the Sb content is preferably 0.001% or more. On the other hand, if Sb is added in excess of 0.020%, the rolling load increases and the productivity decreases. Therefore, the Sb content is preferably 0.020% or less.

Ca: 0.005% or Less, Mg: 0.005% or Less, REM: 0.005% or Less

Ca, Mg, and REM control the shapes of sulfides and oxides, and suppress the formation of coarse inclusions, thereby improving the delayed fracture resistance. To obtain this effect, it is preferable to add each element in an amount of 0.0005% or more. However, excessive addition causes an increase in inclusions and deterioration of the delayed fracture resistance. Therefore, the content of each added element is preferably 0.005% or less. Here, REM is an element containing Sc, Y, and lanthanoid elements.

V: 0.15% or Less

V is an element that contributes to the increase in strength by forming a fine carbonitride. To obtain this effect, the V content is preferably 0.01% or more. On the other hand, since adding a large amount of V lowers the toughness at the time of resistance spot welding and reduces the tensile shear stress. Therefore, the V content is preferably 0.15% or less. It is more preferably 0.10% or less.

Cu: 0.50% or Less

Cu can be added as needed because not only does it contribute to the increase in strength by solid solution strengthening, but it improves the corrosion resistance and thus can improve the delayed fracture resistance. To obtain these effects, the Cu content is preferably 0.05% or more. On the other hand, if Cu is added in excess of 0.50%, the effect is saturated and surface defects resulting from Cu tend to occur more frequently. Therefore, the Cu content is preferably 0.50% or less.

Ni: 0.50% or Less

Similarly to Cu, Ni can also be added as needed because it can improve the delayed fracture resistance by improving the corrosion resistance. Moreover, when added simultaneously with Cu, Ni has the effect of suppressing surface defects caused by Cu. Thus, when Cu is added, addition of Ni is effective. To obtain these effects, the Ni content is 0.05% or more. However, since adding a large amount of Ni lowers the toughness at the time of resistance welding and reduces the tensile shear stress. Therefore, the Ni content is preferably 0.50% or less.

Sn: 0.50% or Less

Similarly to Cu and Ni, Sn can also be added as needed because it can improve the delayed fracture resistance by improving the corrosion resistance. To obtain these effects, the Sn content is 0.05% or more. However, the addition of a large amount of Sn lowers the toughness at the time of resistance welding and reduces the tensile shear stress. Therefore, the Sn content is preferably 0.50% or less.

Zn: 0.10% or Less

Zn is an element that contributes to the formation of martensite after hot pressing, and thus contributes to the formation of martensite after hot pressing, that is, the increase in strength. To obtain these effects, the Zn content is preferably 0.005% or more. However, the addition of a large amount of Zn lowers the toughness at the time of resistance welding and reduces the tensile shear stress. Therefore, the Zn content is preferably 0.10% or less.

Co: 0.10% or Less

Similarly to Cu and Ni, Co can also be added as needed because it can improve the delayed fracture resistance as it increases the corrosion resistance by improving the hydrogen overvoltage. To obtain these effects, the Co content is preferably 0.005% or more. However, the addition of a large amount of Co lowers the toughness at the time of resistance welding and reduces the tensile shear stress. Therefore, the Co content is preferably 0.10% or less.

Zr: 0.10% or Less

Similarly to Cu and Ni, Zr can also be added as needed because it can improve the delayed fracture resistance by improving the corrosion resistance. To obtain these effects, the Zr content is preferably 0.005% or more. However, the addition of a large amount of Zr lowers the toughness at the time of resistance welding and reduces the tensile shear stress. Therefore, the Zr content is preferably 0.10% or less.

Ta: 0.10% or Less

Ta, like Ti, forms alloy carbides and alloy nitrides and contributes to the increase in strength. To obtain this effect, the Ta content is preferably 0.005% or more. Excessively adding Ta, however, fails to increase the addition effect, but instead results in a rise in alloying cost. Therefore, the Ta content is preferably 0.10% or less.

W: 0.10% or Less

Similarly to Cu and Ni, W can also be added as needed since it can improve the delayed fracture resistance by improving the corrosion resistance. To obtain these effects, the W content is preferably 0.005% or more. However, since adding a large amount of W lowers the toughness at the time of resistance welding and reduces the tensile shear stress. Therefore, the W content is preferably 0.10% or less.

The balance other than the above is Fe and inevitable impurities.

Next, the cold-rolled steel sheet for hot pressing and the coating or plating layer of the hot-pressed member according to the present disclosure will be described in detail.

[Coating or Plating Layer of Cold-Rolled Steel Sheet for Hot Pressing]

The cold-rolled steel sheet for hot pressing disclosed herein may be a cold-rolled steel sheet to which a coating or plating layer is not applied, yet in order to prevent oxidation by hot pressing or to improve corrosion resistance, a coating or plating layer may be applied onto the surface of the cold-rolled steel sheet before being subjected to hot pressing.

As a coating or plating layer to be applied onto the surface of the cold-rolled steel sheet for hot pressing according to the present disclosure, an Al or Al alloy coating or plating layer or a Zn or Zn alloy coating or plating layer is suitable. Applying such coating or plating layer onto the surface of the cold-rolled steel sheet for hot pressing prevents oxidation of the surface of the steel sheet by hot pressing, and the corrosion resistance of the hot-pressed member is further improved.

Examples of the Al or Al alloy coating or plating layer include an Al—Si coating layer formed by hot dip coating. In addition, examples of the Zn or Zn alloy coating or plating layer include a hot-dip galvanizing layer formed by hot dip coating, a galvannealing layer formed by alloying it, a Zn electroplating layer formed by electroplating, and a Zn—Ni alloy electroplating layer.

However, the Al or Al alloy coating or plating layer or the Zn or Zn alloy coating or plating layer is not limited to the above-described coating or plating layers, and may be a coating or plating layer which contains at least one of Si, Mg, Ni, Fe, Co, Mn, Sn, Pb, Be, B, P, S, Ti, V, W, Mo, Sb, Cd, Nb, Cr, and Sr in addition to the main component, Al or Zn. The method for forming the Al or Al alloy coating or plating layer or the Zn or Zn alloy coating or plating layer is not limited to the disclosed method at all, and any known hot dip coating, electroplating, vapor deposition plating, or the like is applicable. The Al or Al alloy coating or plating layer or the Zn or Zn alloy coating or plating layer may be a coating or plating layer subjected to an alloying treatment after the coating or plating step.

In the present disclosure, in particular, it is more preferable that the Zn or Zn alloy coating or plating layer is a Zn—Ni alloy coating or plating layer in order to further improve the corrosion resistance of the hot-pressed member or to prevent liquid metal embrittlement cracking caused by molten Zn during hot press forming.

The coating weight of the coating or plating layer is not particularly limited, and may be set in a general manner. For example, it is preferable to have a coating or plating layer with a coating weight of 5 g/m$^2$ to 150 g/m$^2$ per surface. If the coating weight is less than 5 g/m$^2$, it may be difficult to ensure corrosion resistance, while if it exceeds 150 g/m$^2$, the resistance to coating or plating exfoliation may deteriorate.

[Coating or Plating Layer of Hot-Pressed Member]

When a cold-rolled steel sheet for hot pressing to which an Al or Al alloy coating or plating layer or a Zn or Zn alloy coating or plating layer is applied is heated and then hot-pressed, some or all of the coating or plating layer components contained in the Al or Al alloy coating or plating layer or the Zn or Zn alloy coating or plating layer diffuse into the base steel sheet to form a solid solution phase or an intermetallic compound, and at the same time, conversely, Fe which is a component of the base steel sheet diffuses into the Al or Al alloy coating or plating layer or the Zn or Zn alloy coating or plating layer to form a solid solution phase or an intermetallic compound. Further, an oxide layer containing Al is formed on the surface of the Al or Al alloy coating of plating layer, and an oxide layer containing Zn is formed on the surface of the Zn or Zn alloy coating or plating layer.

As an example, when an Al—Si coating or plating layer is heated, it changes to a coating or plating layer mainly composed of an Fe—Al intermetallic compound containing Si. Further, when a hot-dip galvanizing layer, a galvannealing layer, a Zn electroplating layer, and the like are heated, an FeZn solid solution phase in which Zn is dissolved in Fe, a ZnFe intermetallic compound, a ZnO layer in the surface layer, and the like are formed. Furthermore, when the Zn—Ni alloy electroplating layer is heated, a solid solution layer containing Ni in which a coating or plating layer component is dissolved in Fe, an intermetallic compound mainly composed of ZnNi, a ZnO layer in the surface layer, and the like are formed.

As used herein, as described above, a coating or plating layer containing Al formed by heating a cold-rolled steel sheet for hot pressing to which an Al or Al alloy coating or plating layer is applied is referred to as an Al or Al alloy coating or plating layer, and a coating or plating layer containing Zn formed by heating a cold-rolled steel sheet for hot pressing to which a Zn or Zn alloy coating or plating layer is applied is referred to as a Zn or Zn alloy coating or plating layer.

Next, the method for manufacturing the cold-rolled steel sheet for hot pressing according to the present disclosure will be described.

In the present disclosure, in the production of the above-described cold-rolled steel sheet, at first, a steel material (slab) having the above-described predetermined composition is hot rolled under a set of conditions including a rolling reduction of 12% or more at a final pass of finish rolling, a rolling reduction of 15% or more at a pass immediately before the final pass, and a finisher delivery temperature of 860° C. to 950° C.

After the hot rolling, the hot-rolled steel sheet is subjected to primary cooling whereby the hot-rolled steel sheet is cooled to a cooling end temperature of 700° C. or lower at a first average cooling rate of 70° C./s or higher up to the cooling end temperature.

After the primary cooling, the steel sheet is subjected to secondary cooling whereby the steel sheet is coiled at a coiling temperature of 520° C. or lower at a second average cooling rate of 5° C./s to 50° C./s up to the coiling temperature.

Then, the coiled hot-rolled steel sheet is pickled, and then subjected to a first heat treatment whereby it is heated to a temperature range of 400° C. to 700° C.

Then, the steel sheet is cold rolled to obtain a cold-rolled steel sheet, then the cold-rolled steel sheet is subjected to a second heat treatment whereby the cold-rolled steel sheet is heated to a temperature range of 720° C. to 850° C. at an average heating rate of 5° C./s to 20° C./s and subjected to 15 seconds to 600 seconds of soaking in the temperature range of 720° C. to 850° C.

After the soaking, the cold-rolled steel sheet is subjected to a tertiary cooling whereby the cold-rolled steel sheet is cooled to a cooling end temperature of 600° C. or lower at a third average cooling rate of 5° C./s or higher.

Hereinafter, the above manufacturing method will be described in detail for each step.

[Heating]

For a steel slab as a raw material after being cast, it is preferable to start hot rolling either at 1150° C. to 1270° C. directly after casting without reheating or after reheating to 1150° C. to 1270° C. Under preferred conditions for hot rolling, at first, a steel slab is hot rolled at a hot rolling start temperature of 1150° C. to 1270° C.

In the present disclosure, after a steel slab is prepared, in addition to a conventional method in which a steel slab is first cooled to room temperature and then reheated, an energy saving process is also applicable without any problem, such as hot direct rolling or direct rolling, in which a steel slab is charged into a heating furnace as a warm slab without being cooled, in which a steel slab is rolled immediately after heat retention, or in which a steel slab is rolled directly after casting.

[Hot Rolling]

Rolling Reduction at a Final Pass of Finish Rolling: 12% or More

It is necessary to set the rolling reduction in the final pass of finish rolling to 12% or more from the perspectives of introducing a large number of shear bands into austenite grains, producing more nucleation sites during ferrite transformation after hot rolling to refine the crystal grains in the microstructure of the hot rolled sheet, and eliminating Mn bands. The rolling reduction at a final pass of finish rolling is preferably 13% or more. The upper limit of the rolling reduction is not particularly limited. However, when the hot rolling load is increased, the thickness variation in the width direction of the steel sheet increases, and the delayed fracture resistance may be degraded. Therefore, the upper limit is 30% or less.

Rolling Reduction at a Pass Immediately Before the Final Pass of Finish Rolling: 15% or More It is necessary to set the rolling reduction at a pass immediately before the final pass to 15% or more from the perspectives of further enhancing the strain accumulation effect such that a large number of shear bands are introduced into the austenite grains, producing even more nucleation sites during ferrite transformation to further refine the crystal grains in the microstructure of the hot rolled sheet, and further eliminating Mn bands. The rolling reduction at a pass immediately before the final pass of finish rolling is preferably 18% or more. The upper limit of the rolling reduction is not particularly limited. However, when the hot rolling load is increased, the thickness variation in the width direction of the steel sheet increases, and the delayed fracture resistance may be degraded. Therefore, the upper limit is 30% or less.

Finisher Delivery Temperature: 860° C. to 950° C.

The hot rolling needs to be finished in the austenite single phase region in order to improve the resistance to resistance welding cracking after annealing by increasing the uniformity of the microstructure of the steel sheet and reducing the anisotropy of the material property. Therefore, the finisher delivery temperature is 860° C. or higher. On the other hand, when the finisher delivery temperature exceeds 950° C., the hot-rolled microstructure becomes coarse, and the crystal grains after annealing are also coarsened. Therefore, the upper limit of the finisher delivery temperature is 950° C.

[Cooling after the Hot Rolling]

Primary Cooling: Cooling to 700° C. or Lower at a First Average Cooling Rate of 70° C./s or Higher The austenite undergoes ferrite transformation during the cooling process after the end of the hot rolling. However, since the ferrite coarsens at high temperatures, quenching is performed after the end of the hot rolling to homogenize the microstructure as much as possible, while at the same time suppressing generation of Nb-based precipitates. Accordingly, at first, as primary cooling, cooling is performed to 700° C. or lower at a first average cooling rate of 70° C./s or higher. If the first average cooling rate is lower than 70° C./s, the ferrite is coarsened, and the microstructure of the hot-rolled steel sheet becomes inhomogeneous, leading to a reduction in the delayed fracture resistance and the tensile shear stress after resistance spot welding.

On the other hand, if the cooling end temperature in the primary cooling is higher than 700° C., pearlite is excessively formed in the microstructure of the hot-rolled steel sheet, and the microstructure of the steel sheet eventually becomes heterogeneous, again leading to a reduction in the delayed fracture resistance and the tensile shear stress after resistance spot welding.

Secondary Cooling: Cooling to 520° C. or Lower at a Second Average Cooling Rate of 5° C./s to 50° C./s If the average cooling rate in this secondary cooling is lower than 5° C./s, ferrite or pearlite is excessively formed in the microstructure of the hot-rolled steel sheet, and the microstructure of the steel sheet eventually becomes heterogeneous, and Nb-based precipitates coarsen, leading to a reduction in the delayed fracture resistance and the tensile shear stress after resistance spot welding. On the other hand, if the average cooling rate in the secondary cooling is higher than 50° C./s, pearlite is excessively formed in the microstructure of the hot-rolled steel sheet, and the element distribution of C becomes uneven, leading to a reduction in the delayed fracture resistance after hot pressing and the tensile shear stress after resistance spot welding. Furthermore, cooling to temperatures above 520° C. causes excessive formation of ferrite or pearlite in the microstructure of the hot-rolled steel sheet and coarsening of the Nb-based precipitates, again leading to a reduction in the delayed fracture resistance and the tensile shear stress after resistance spot welding.

Coiling Temperature: 520° C. or Lower

If the coiling temperature is higher than 520° C., ferrite and pearlite are excessively formed in the microstructure of the hot-rolled steel sheet, and the microstructure of the steel sheet eventually becomes heterogeneous, leading to a reduction in the delayed fracture resistance and the tensile shear stress after resistance spot welding. To avoid this, it is important to perform coiling with a bainite single phase. In addition, when coiling is performed at high temperature, Nb-based precipitates coarsen, and the delayed fracture resistance deteriorates. Therefore, in the present disclosure, the upper limit of the coiling temperature is 520° C. It is preferably 500° C. or lower. The lower limit of the coiling temperature is not particularly specified, yet if the coiling temperature is too low, hard martensite is excessively formed to increase the cold rolling load. Therefore, the lower limit is preferably 300° C. or higher.

[Pickling]

After the hot rolling, pickling is performed to remove scale from the surface of the hot-rolled sheet. The pickling treatment is not particularly limited and may be carried out according to a conventional method.

[Heat Treatment]

First Heat Treatment: Heating to a Temperature Range of 400° C. to 700° C.

In the present disclosure, heat treatment is performed twice after hot rolling. With this setup, it is possible to eliminate Mn segregation and control the distribution state of the Nb-based precipitates to improve the delayed fracture resistance and the tensile shear stress after resistance spot welding.

If the heat treatment temperature of the first heat treatment is lower than 400° C., the element distribution becomes insufficient, and the influence of the element distribution state after hot rolling can not be removed. Accordingly, Mn segregation is not eliminated even after the subsequent second heat treatment and hot pressing, and as a result, the delayed fracture resistance is deteriorated. On the other hand, when the first heat treatment is performed at temperatures above 700° C., coarse and hard martensite is excessively present, the microstructure after the second heat treatment becomes uneven, and Nb-based precipitates become coarse. Accordingly, the desired microstructure and distribution state of Nb-based precipitates can not be obtained after the hot pressing. Therefore, the heat treatment temperature of the first heat treatment is in a range of 400° C. to 700° C. It is preferably in a range of 450° C. to 650° C. The holding time is preferably 80,000 seconds or shorter from the viewpoint of suppressing the coarsening of Nb precipitates.

Cold Rolling

Cold rolling is performed to roll a steel sheet into a cold-rolled sheet having a predetermined thickness. The cold rolling is not particularly limited and may be carried out according to a conventional method.

Second Heat Treatment: Heating to a Temperature Range of 720° C. to 850° C. at an Average Heating Rate of 5° C./s to 20° C./s and Subjected to 15 Seconds to 600 Seconds of Soaking in the Temperature Range of 720° C. to 850° C.

The second heat treatment is carried out to promote recrystallization after cold rolling and to control the microstructure of the member after being subjected to hot pressing, the distribution state of Nb-based precipitates, and Mn segregation on the surface.

In the second heat treatment, excessively rapid heating makes it difficult for recrystallization to proceed, the upper limit of the average heating rate is set at 20° C./s. However, when the heating rate is too low, ferrite and martensite grains become coarsened, and a desired microstructure can not be obtained after hot pressing. Therefore, an average heating rate of 5° C./s or higher is required. It is preferably 8° C./s or higher. By controlling the average heating rate, it is possible to make the crystal grains finer.

Then, the steel sheet is heated to a soaking temperature range of 720° C. to 850° C. described later.

Soaking Temperature: 720° C. to 850° C.

The soaking temperature is set in a temperature range of a ferrite and austenite dual phase region. Below 720° C., the martensite fraction decreases and the Mn segregation on the surface increases. Therefore, the lower limit of the soaking temperature is set at 720° C. On the other hand, if the soaking temperature is too high, crystal grain growth of austenite becomes remarkable, the crystal grains and Nb-based precipitates become coarse, and the delayed fracture resistance decreases. Therefore, the soaking temperature is 850° C. or lower. It is preferably 830° C. or lower.

Soaking Duration: 15 Seconds to 600 Seconds

In the above-described soaking temperature range, a holding time of at least 15 seconds is necessary for progress of recrystallization and austenite transformation of some or all of the microstructures. On the other hand, if the holding time is excessively long, microsegregation of Mn is promoted and bending workability is deteriorated. Therefore, the holding time is preferably 600 seconds or shorter.

[Cooling]

Cooling Conditions after Soaking: Cooling to a Temperature Range of 600° C. or Lower at a Third Average Cooling Rate of 5° C./s or Higher After the above-described soaking treatment (annealing treatment), it is necessary to perform cooling at an average cooling rate of 5° C./s or higher from the soaking temperature to a temperature range (cooling end temperature) of 600° C. or lower. If the average cooling rate is lower than 5° C./s, ferrite transformation proceeds during cooling, and the volume fraction of martensite in the cold-rolled steel sheet decreases and Nb-based precipitates become coarse, making it difficult to ensure the delayed fracture resistance. The upper limit of the average cooling rate is not particularly specified, yet is preferably 30° C./s or lower from the viewpoint of equipment and cost. In addition, when the cooling end temperature is higher than 600° C., pearlite is excessively formed, and a predetermined volume fraction in the microstructure of the steel sheet can not be obtained, causing deterioration of the delayed fracture resistance.

In the above-described series of manufacturing processes, particularly important in the present disclosure are the hot rolling (including the subsequent two-stage cooling step) and two heat treatments after the hot rolling (i.e., the first heat treatment step as well as the second heat treatment step and the subsequent cooling step).

That is, by appropriately controlling the above-described hot rolling step and two heat treatments, Mn segregation is eliminated and the distribution state of Nb-based precipitates is improved. As a result, not only can at least 30 Nb-based precipitates having a grain size of less than 0.10 μm be deposited on average per 100 μm$^2$ of a cross section parallel to the thickness direction of the steel sheet, the standard deviation of Vickers hardness measured every 200 on the surface of the steel sheet can also be 35 or less. In addition, by appropriately controlling two heat treatments (in particular, the second heat treatment step and the subsequent cooling step), it is possible to provide the resultant cold-rolled steel sheet with 5% or more by volume fraction of martensite having an average aspect ratio of 3.0 or less and an average grain size of 3 μm or less.

Thereafter, the cold-rolled steel sheet may be subjected to a coating or plating treatment such as hot-dip galvanizing, or used as it is without being subjected to such treatment.

[Coating or Plating]

The cold-rolled steel sheet for hot pressing disclosed herein may be used as the cold-rolled steel sheet manufactured by the above-described manufacturing process or, depending on the purpose, may be subjected to an Al or Al alloy coating or plating treatment or a Zn or Zn alloy coating or plating treatment to form an Al or Al alloy coating or plating layer or a Zn or Zn alloy coating or plating layer.

Such coating or plating treatment is not limited at all, and any known hot-dip coating, electroplating, vapor deposition plating, and the like can be applied. In addition, after the coating or plating treatment, an alloying treatment may be performed. For typical coating or plating treatments, examples of the Al or Al alloy coating or plating treatment include a treatment to apply hot-dip aluminum (Al) coating and a treatment to apply hot-dip Al—Si coating, and examples of zinc or zinc alloy coating or plating treatment include a treatment to apply hot-dip galvanizing or zinc-nickel electroplating and a treatment to apply hot-dip galvanizing followed by an alloying treatment.

Temper rolling may also be carried out on the cold-rolled steel sheet. In this case, a preferred elongation ratio is 0.05% to 2.0%.

Next, hot pressing performed on the obtained cold-rolled steel sheet will be described.

The method and conditions of hot pressing are not limited in any way, and all known hot pressing methods can be applied. Although one example is given below, the present disclosure is not so limited.

For example, a cold-rolled steel sheet for hot pressing as a raw material may be heated to a temperature range of an $Ac_3$ transformation temperature to 1000° C. using an electric furnace, a gas furnace, an electric heating furnace, a far infrared heating furnace, or the like, held in this temperature range for 0 seconds to 600 seconds, transported to a press, and subjected to hot pressing in a temperature range of 550° C. to 800° C. The heating rate at the time of heating the cold-rolled steel sheet for hot pressing may be 3° C./s to 200° C./s.

Here, the $Ac_3$ transformation temperature can be determined by:

$$Ac_3 \text{ transformation temperature (° C.)}=881-206C+53Si-15Mn-20Ni-1Cr-27Cu+41Mo$$

Where each element symbol represents the content by mass % of the corresponding element. For any element not contained, it is calculated as zero.

EXAMPLES

The following describes examples according to the disclosure.

The present disclosure is by no means limited by the examples described below, and can be implemented with appropriate modifications without departing from the spirit of the present disclosure. All such modifications are encompassed by the technical scope of the present disclosure.

Steels having the chemical compositions listed in Table 1 were prepared by steelmaking and cast into slabs, then heated to 1250° C., and then subjected to hot rolling under the conditions listed in Table 2 for the finisher delivery temperature (FDT). Then, each hot-rolled steel sheet is cooled to a cooling end temperature (first cooling temperature) at a first average cooling rate (Cooling Rate 1) listed in Table 2, then cooled to a coiling temperature (CT) at a second average cooling rate (Cooling Rate 2), and then wound in a coil form. Note that some samples were not subjected to a two-stage cooling step after being subjected to hot rolling, but cooled at a fixed speed, and wound in a coil form.

Then, each hot-rolled sheet thus obtained was pickled, subjected to a first heat treatment listed in Table 2, and then cold rolled with a rolling reduction listed in Table 2 to obtain a cold-rolled sheet (sheet thickness: 1.4 mm).

Then, each cold-rolled steel sheet thus obtained was subjected to a second heat treatment (also referred to as annealing treatment) under the conditions listed in Table 2 in a continuous annealing line (CAL) or a continuous galvanizing line (CGL), and cold-rolled steel sheets (CR) were obtained for those having passed through CAL and hot-dip galvanized steel sheets (GI) were obtained for those having passed through CGL. Note that some of the steel sheets having passed through CGL were subjected to a hot-dip galvanization treatment, followed by an alloying treatment at 550° C., to obtain galvannealed steel sheets (GA). In addition, a hot-dip aluminum coating treatment was performed to obtain a hot-dip aluminum coated steel sheet (AS). Furthermore, some were partially annealed in CAL, and zinc-nickel electroplated steel sheets (EZN) were obtained in an electrogalvanizing line (EGL).

Then, hot pressing was performed on the obtained cold-rolled steel sheets (including those subjected to coating or plating) under the conditions listed in Table 3.

The mold used in the hot pressing had a punch width of 70 mm, a punch shoulder radius of 4 mm, and a die shoulder radius of 4 mm, and the forming depth was 30 mm. Heating of each cold-rolled steel sheet was performed in the atmosphere using either an infrared heating furnace or an atmosphere heating furnace depending on the heating rate. In addition, cooling after pressing was performed by combining sandwiching of each steel sheet between the punch and the die with air cooling on the die released from the sandwiching, and each steel sheet was cooled from the press (start) temperature to 150° C. At this time, the cooling rate was adjusted by changing the holding time of the punch at the bottom dead center in a range of 1 second to 60 seconds.

A JIS No. 5 tensile test specimen was collected from the position of the hat bottom portion of each hot-pressed member thus obtained, and a tensile test was performed according to JIS Z 2241 to measure the tensile strength (TS).

Moreover, for delayed fracture resistance test, a JIS No. 5 tensile test specimen was sampled from the position of the hat bottom portion of each hot-pressed member, and subjected to a constant load test. Load was applied while immersing each test specimen in a solution of hydrochloric acid (pH=2.5) at room temperature to evaluate the presence or absence of fracture. Assuming that the load stress is 800 MPa and 1100 MPa, the delayed fracture resistance was judged as "Good" if fracture did not occur for 100 hours or more under both load stresses, "Fair" if fracture did not occur for 100 hours or more under the load stress of 800 MPa, but occurred in less than 100 hours under the load stress of 1100 MPa, or "Poor" if fracture occurred in less than 100 hours under both load stresses.

Furthermore, regarding the tensile shear stress after resistance spot welding, resistance welding (spot welding) was performed using two tensile shear test pieces sampled from the position of the hat bottom portion of each hot-pressed member obtained in accordance with JIS Z 3136. The welding was performed by resistance spot welding using a resistance welding machine of servomotor pressure type at single phase direct current (50 Hz) attached to a welding gun on a sheet combination in which two steel sheets were stacked. The welding conditions were a pressure of 3.8 kN and a hold time of 0.1 seconds. The welding current and welding time were adjusted such that the nugget diameter was 6.3 mm. The tensile shear stress after resistance spot welding was judged as "Good" if the strength after tensile shear was 11 kN or more, "Fair" if the strength was 9 kN or more and less than 11 kN, or "Poor" if the strength was less than 9 kN.

To determine the volume fraction of martensite of the cold-rolled steel sheet after being annealed and the member after being subjected to hot pressing, a cross section parallel to the rolling direction and the thickness direction of the steel sheet was polished, treated by corrosion with 3 vol % nital, and observed under a scanning electron microscope (SEM) at 5000 times magnification, and the area ratio was measured by a point count method (in accordance with ASTM E562-83 (1988)), and the measured area ratio was used as the volume fraction. Using Image-Pro available from Media Cybernetics, micrographs in which crystal grains of prior austenite, ferrite, and martensite had been respectively identified in advance were captured from the microstructural micrographs of each steel sheet (taken at 10 locations of 20 μm×20 μm at 5000 times magnification) to determine the area of each crystal grain. The equivalent circular diameter of each crystal grain was calculated, the results were averaged, and the average was used as the area of each crystal grain. Regarding the average aspect ratios of prior austenite, martensite, and ferrite, the aspect ratios of respective crystal grains were determined based on the above micrographs, and the results were averaged to determine the average aspect ratios. As used herein, the average aspect ratio of crystal grains is a value obtained by dividing the major axis length of crystal grains by the minor axis length.

Further, for both cold-rolled steel sheets and pressed members, to determine the grain size of Nb-based precipitates, a cross section parallel to the thickness direction was observed at 10 locations of 0.5 μm×0.5 μm under a transmission electron microscope (TEM) at 10000 times magnification, and the equivalent circle diameter was calculated using Image-Pro available from Media Cybernetics with a lower limit of 0.005 μm to determine the grain size.

To determine the number of Nb-based precipitates having a grain size of less than 0.10 μm, the cross section was observed at 10 locations of 0.5 μm×0.5 μm under a transmission electron microscope (TEM) at 10000 times magnification, and the average number density of these 10 locations was obtained. In this method, it was possible to count Nb-based precipitates having a grain size of 0.005 μm or more.

As the standard deviation of Vickers hardness, Vickers hardness was measured at 10 locations each for every 200 μm in the rolling direction and the transverse direction (a direction perpendicular to the rolling direction) on the surfaces of cold-rolled steel sheets and hot-pressed members (100 points in total [10 locations in the rolling direction×10 locations in the transverse direction=100 points in a grid pattern]), and the average standard deviation was determined. The test force of the measurement conditions of Vickers hardness was 300 g (2.942 N), and the holding time was 15 seconds.

The microstructures of the cold-rolled steel sheets and the hot-pressed members thus obtained are listed in Table 4. In addition, Table 5 lists the measurement results of the tensile properties, the delayed fracture resistance, and the tensile shear stress of the hot-pressed members.

TABLE 1

| Steel ID | Chemical composition (mass %) | | | | | | | | | $Ac_3$ transformation temp. (° C.) |
|---|---|---|---|---|---|---|---|---|---|---|
| | C | Si | Mn | P | S | Al | N | Nb | Others | |
| A | 0.31 | 0.20 | 1.85 | 0.01 | 0.001 | 0.03 | 0.002 | 0.024 | — | 800 |
| B | 0.34 | 1.32 | 1.58 | 0.01 | 0.001 | 0.02 | 0.003 | 0.031 | Ti: 0.02, V: 0.01 | 857 |
| C | 0.32 | 1.40 | 1.23 | 0.02 | 0.001 | 0.02 | 0.002 | 0.024 | Mo: 0.12, Cr: 0.22 | 876 |
| D | 0.38 | 0.19 | 1.64 | 0.01 | 0.002 | 0.03 | 0.002 | 0.029 | Ti: 0.02, B: 0.002, Sb: 0.009 | 788 |
| E | 0.29 | 0.22 | 2.21 | 0.01 | 0.002 | 0.03 | 0.002 | 0.030 | Cu: 0.22, Ni: 0.11 | 792 |
| F | 0.30 | 0.05 | 1.59 | 0.01 | 0.001 | 0.02 | 0.002 | 0.021 | Sn: 0.05, Zn: 0.02, Co: 0.02 | 798 |
| G | 0.34 | 0.24 | 2.03 | 0.02 | 0.002 | 0.03 | 0.003 | 0.022 | Zr: 0.01, Ta: 0.02, W: 0.01 | 793 |
| H | 0.32 | 0.93 | 1.43 | 0.01 | 0.003 | 0.02 | 0.002 | 0.019 | Ca: 0.001, Mg: 0.001, REM: 0.001 | 843 |
| I | 0.24 | 0.25 | 1.64 | 0.01 | 0.001 | 0.03 | 0.003 | 0.025 | — | 820 |
| J | 0.45 | 0.02 | 2.30 | 0.01 | 0.001 | 0.03 | 0.002 | 0.018 | — | 755 |
| K | 0.31 | 0.15 | 0.50 | 0.01 | 0.001 | 0.03 | 0.002 | 0.014 | — | 818 |
| L | 0.33 | 0.22 | 3.41 | 0.01 | 0.001 | 0.02 | 0.002 | 0.022 | — | 774 |
| M | 0.32 | 0.25 | 2.14 | 0.01 | 0.001 | 0.02 | 0.003 | — | — | 796 |
| N | 0.34 | 0.25 | 1.85 | 0.01 | 0.001 | 0.03 | 0.003 | 0.012 | Ti: 0.02, Cr: 0.18, B: 0.002, Sb: 0.008 | 796 |

TABLE 2

| | | Hot rolling | | | | | | | |
|---|---|---|---|---|---|---|---|---|---|
| Specimen No. | Steel ID | Rolling reduction at a pass immediately before the final pass % | Rolling reduction at final pass % | FDT ° C. | Cooling rate 1 ° C./s | First cooling temp. ° C. | Cooling rate 2 ° C./s | CT ° C. | First heat treatment Temp. ° C. |
| 1 | A | 18 | 15 | 900 | 100 | 640 | 20 | 500 | 550 |
| 2 | B | 18 | 15 | 900 | 100 | 640 | 20 | 500 | 550 |
| 3 | C | 18 | 15 | 900 | 100 | 640 | 20 | 500 | 550 |
| 4 | D | 18 | 15 | 900 | 100 | 640 | 20 | 500 | 550 |
| 5 | E | 18 | 15 | 900 | 100 | 640 | 20 | 500 | 550 |
| 6 | F | 18 | 15 | 900 | 100 | 640 | 20 | 500 | 550 |

TABLE 2-continued

| | | | | | | | | | |
|---|---|---|---|---|---|---|---|---|---|
| 7  | G | 18 | 15 | 900 | 100 | 640 | 20 | 500 | 550 |
| 8  | H | 18 | 15 | 900 | 100 | 640 | 20 | 500 | 550 |
| 9  | A | 15 | 15 | 900 | 100 | 640 | 20 | 500 | 550 |
| 10 | A | 18 | 12 | 900 | 100 | 640 | 20 | 500 | 550 |
| 11 | A | 18 | 15 | 860 | 100 | 640 | 20 | 500 | 550 |
| 12 | A | 18 | 15 | 950 | 100 | 640 | 20 | 500 | 550 |
| 13 | A | 18 | 15 | 900 | 70  | 640 | 20 | 500 | 550 |
| 14 | A | 18 | 15 | 900 | 100 | 700 | 20 | 500 | 550 |
| 15 | A | 18 | 15 | 900 | 100 | 640 | 5  | 500 | 550 |
| 16 | A | 18 | 15 | 900 | 100 | 640 | 50 | 500 | 550 |
| 17 | A | 18 | 15 | 900 | 100 | 640 | 20 | 520 | 550 |
| 18 | A | 18 | 15 | 900 | 100 | 640 | 20 | 500 | 400 |
| 19 | A | 18 | 15 | 900 | 100 | 640 | 20 | 500 | 700 |
| 20 | A | 18 | 15 | 900 | 100 | 640 | 20 | 500 | 550 |
| 21 | A | 18 | 15 | 900 | 100 | 640 | 20 | 500 | 550 |
| 22 | A | 18 | 15 | 900 | 100 | 640 | 20 | 500 | 550 |
| 23 | A | 18 | 15 | 900 | 100 | 640 | 20 | 500 | 550 |
| 24 | A | 18 | 15 | 900 | 100 | 640 | 20 | 500 | 550 |
| 25 | A | 18 | 15 | 900 | 100 | 640 | 20 | 500 | 550 |
| 26 | A | 18 | 15 | 900 | 100 | 640 | 20 | 500 | 550 |
| 27 | A | 18 | 15 | 900 | 100 | 640 | 20 | 500 | 550 |
| 28 | A | 18 | 15 | 900 | 100 | 640 | 20 | 500 | 550 |
| 29 | A | 18 | 15 | 900 | 100 | 640 | 20 | 500 | 550 |
| 30 | A | 18 | 15 | 900 | 100 | 640 | 20 | 500 | 550 |
| 31 | A | 18 | 15 | 900 | 100 | 640 | 20 | 500 | 550 |
| 32 | B | 18 | 15 | 900 | 100 | 640 | 20 | 500 | 550 |
| 33 | C | 18 | 15 | 900 | 100 | 640 | 20 | 500 | 550 |
| 34 | D | 18 | 15 | 900 | 100 | 640 | 20 | 500 | 550 |
| 35 | E | 18 | 15 | 900 | 100 | 640 | 20 | 500 | 550 |
| 36 | F | 18 | 15 | 900 | 100 | 640 | 20 | 500 | 550 |
| 37 | A | 18 | 15 | 900 | 100 | 640 | 20 | 500 | 550 |
| 38 | B | 18 | 15 | 900 | 100 | 640 | 20 | 500 | 550 |
| 39 | C | 18 | 15 | 900 | 100 | 640 | 20 | 500 | 550 |
| 40 | D | 18 | 15 | 900 | 100 | 640 | 20 | 500 | 550 |
| 41 | E | 18 | 15 | 900 | 100 | 640 | 20 | 500 | 550 |
| 42 | F | 18 | 15 | 900 | 100 | 640 | 20 | 500 | 550 |
| 43 | A | 18 | 15 | 900 | 100 | 640 | 20 | 500 | 550 |
| 44 | B | 18 | 15 | 900 | 100 | 640 | 20 | 500 | 550 |
| 45 | C | 18 | 15 | 900 | 100 | 640 | 20 | 500 | 550 |
| 46 | D | 18 | 15 | 900 | 100 | 640 | 20 | 500 | 550 |
| 47 | E | 18 | 15 | 900 | 100 | 640 | 20 | 500 | 550 |
| 48 | F | 18 | 15 | 900 | 100 | 640 | 20 | 500 | 550 |
| 49 | A | 18 | 15 | 900 | 100 | 640 | 20 | 500 | 550 |
| 50 | B | 18 | 15 | 900 | 100 | 640 | 20 | 500 | 550 |
| 51 | C | 18 | 15 | 900 | 100 | 640 | 20 | 500 | 550 |
| 52 | D | 18 | 15 | 900 | 100 | 640 | 20 | 500 | 550 |
| 53 | E | 18 | 15 | 900 | 100 | 640 | 20 | 500 | 550 |
| 54 | F | 18 | 15 | 900 | 100 | 640 | 20 | 500 | 550 |
| 55 | A | 18 | 15 | 900 | 100 | 640 | 20 | 500 | 550 |
| 56 | A | 18 | 15 | 900 | 100 | 640 | 20 | 500 | 550 |
| 57 | A | 18 | 15 | 900 | 100 | 640 | 20 | 500 | 550 |
| 58 | A | 18 | 15 | 900 | 100 | 640 | 20 | 500 | 550 |
| 59 | A | 18 | 15 | 900 | 100 | 640 | 20 | 500 | 550 |
| 60 | A | 18 | 15 | 900 | 100 | 640 | 20 | 500 | 550 |
| 61 | A | 18 | 15 | 900 | 100 | 640 | 20 | 500 | 550 |
| 62 | A | 18 | 15 | 900 | 100 | 640 | 20 | 500 | 550 |
| 63 | A | 18 | 15 | 900 | 100 | 640 | 20 | 500 | 550 |
| 64 | A | 18 | 15 | 900 | 100 | 640 | 20 | 500 | 550 |
| 65 | A | 18 | 15 | 900 | 100 | 640 | 20 | 500 | 550 |
| 66 | A | 5  | 5  | 900 | 100 | 640 | 20 | 500 | 550 |
| 67 | A | 18 | 15 | 900 | 30  | 650 | 20 | 500 | 550 |
| 68 | A | 18 | 15 | 900 | 100 | 770 | 20 | 500 | 550 |
| 69 | A | 18 | 13 | 900 | 100 | 620 | 2  | 500 | 550 |
| 70 | A | 18 | 13 | 900 | 100 | 680 | 10 | 700 | 550 |
| 71 | A | 18 | 13 | 900 | 100 | 680 | 10 | 500 | —   |
| 72 | A | 18 | 13 | 900 | 100 | 680 | 20 | 500 | 900 |
| 73 | A | 18 | 14 | 900 | 100 | 620 | 25 | 500 | 550 |
| 74 | B | 18 | 13 | 920 | 100 | 600 | 25 | 500 | 550 |
| 75 | B | 18 | 15 | 900 | 100 | 600 | 25 | 500 | 550 |
| 76 | B | 18 | 15 | 900 | 100 | 620 | 20 | 500 | 550 |
| 77 | B | 18 | 15 | 880 | 100 | 620 | 25 | 500 | 550 |
| 78 | B | 18 | 15 | 900 | 100 | 620 | 25 | 500 | 550 |
| 79 | I | 18 | 15 | 900 | 100 | 600 | 20 | 500 | 550 |
| 80 | J | 18 | 15 | 900 | 100 | 600 | 20 | 500 | 550 |
| 81 | J | 18 | 15 | 900 | 100 | 600 | 20 | 550 | 450 |
| 82 | K | 18 | 15 | 900 | 100 | 650 | 20 | 500 | 550 |
| 83 | K | 18 | 15 | 900 | 100 | 650 | 20 | 500 | 650 |
| 84 | L | 18 | 15 | 900 | 100 | 600 | 25 | 500 | 550 |
| 85 | M | 18 | 15 | 900 | 100 | 620 | 25 | 500 | 550 |

TABLE 2-continued

| 86 | N | 18 | 15 | 900 | 100 | 620 | 25 | 500 | 550 |
| 87 | B | 18 | 15 | 900 | Cooling rate: 10° C./s | | | 500 | 500 |
| 88 | B | 18 | 15 | 900 | Cooling rate: 200° C./s | | | 500 | 500 |

| | Rolling | Second heat treatment | | | | | | |
| --- | --- | --- | --- | --- | --- | --- | --- | --- |
| Specimen No. | reduction in cold rolling % | Average heating rate ° C./s | Soaking temp. ° C. | Holding time s | Cooling rate 3 ° C./s | Cooliing end temp. ° C. | Coating or plating | Remarks |
| 1 | 50 | 10 | 760 | 180 | 7 | 525 | GA | Example |
| 2 | 50 | 10 | 760 | 180 | 7 | 525 | GA | Example |
| 3 | 50 | 10 | 760 | 180 | 7 | 525 | GA | Example |
| 4 | 50 | 10 | 760 | 180 | 7 | 525 | GA | Example |
| 5 | 50 | 10 | 760 | 180 | 7 | 525 | GA | Example |
| 6 | 50 | 10 | 760 | 180 | 7 | 525 | GA | Example |
| 7 | 50 | 10 | 760 | 180 | 7 | 525 | GA | Example |
| 8 | 50 | 10 | 760 | 180 | 7 | 525 | GA | Example |
| 9 | 50 | 10 | 760 | 180 | 7 | 525 | GA | Example |
| 10 | 50 | 10 | 760 | 180 | 7 | 525 | GA | Example |
| 11 | 50 | 10 | 760 | 180 | 7 | 525 | GA | Example |
| 12 | 50 | 10 | 760 | 180 | 7 | 525 | GA | Example |
| 13 | 50 | 10 | 760 | 180 | 7 | 525 | GA | Example |
| 14 | 50 | 10 | 760 | 180 | 7 | 525 | GA | Example |
| 15 | 50 | 10 | 760 | 180 | 7 | 525 | GA | Example |
| 16 | 50 | 10 | 760 | 180 | 7 | 525 | GA | Example |
| 17 | 50 | 10 | 760 | 180 | 7 | 525 | GA | Example |
| 18 | 50 | 10 | 760 | 180 | 7 | 525 | GA | Example |
| 19 | 50 | 10 | 760 | 180 | 7 | 525 | GA | Example |
| 20 | 30 | 10 | 760 | 180 | 7 | 525 | GA | Example |
| 21 | 70 | 10 | 760 | 180 | 7 | 525 | GA | Example |
| 22 | 50 | 5 | 760 | 180 | 7 | 525 | GA | Example |
| 23 | 50 | 20 | 760 | 180 | 7 | 525 | GA | Example |
| 24 | 50 | 10 | 720 | 180 | 7 | 525 | GA | Example |
| 25 | 50 | 10 | 850 | 180 | 7 | 525 | GA | Example |
| 26 | 50 | 10 | 760 | 15 | 7 | 525 | GA | Example |
| 27 | 50 | 10 | 760 | 600 | 7 | 525 | GA | Example |
| 28 | 50 | 10 | 760 | 180 | 5 | 525 | GA | Example |
| 29 | 50 | 10 | 760 | 180 | 30 | 525 | GA | Example |
| 30 | 50 | 10 | 760 | 180 | 7 | 600 | GA | Example |
| 31 | 50 | 10 | 760 | 180 | 7 | 525 | CR | Example |
| 32 | 50 | 10 | 760 | 180 | 7 | 525 | CR | Example |
| 33 | 50 | 10 | 760 | 180 | 7 | 525 | CR | Example |
| 34 | 50 | 10 | 760 | 180 | 7 | 525 | CR | Example |
| 35 | 50 | 10 | 760 | 180 | 7 | 525 | CR | Example |
| 36 | 50 | 10 | 760 | 180 | 7 | 525 | CR | Example |
| 37 | 50 | 10 | 760 | 180 | 7 | 525 | AS | Example |
| 38 | 50 | 10 | 760 | 180 | 7 | 525 | AS | Example |
| 39 | 50 | 10 | 760 | 180 | 7 | 525 | AS | Example |
| 40 | 50 | 10 | 760 | 180 | 7 | 525 | AS | Example |
| 41 | 50 | 10 | 760 | 180 | 7 | 525 | AS | Example |
| 42 | 50 | 10 | 760 | 180 | 7 | 525 | AS | Example |
| 43 | 50 | 10 | 760 | 180 | 7 | 525 | GI | Example |
| 44 | 50 | 10 | 760 | 180 | 7 | 525 | GI | Example |
| 45 | 50 | 10 | 760 | 180 | 7 | 525 | GI | Example |
| 46 | 50 | 10 | 760 | 180 | 7 | 525 | GI | Example |
| 47 | 50 | 10 | 760 | 180 | 7 | 525 | GI | Example |
| 48 | 50 | 10 | 760 | 180 | 7 | 525 | GI | Example |
| 49 | 50 | 10 | 760 | 180 | 7 | 525 | EZN | Example |
| 50 | 50 | 10 | 760 | 180 | 7 | 525 | EZN | Example |
| 51 | 50 | 10 | 760 | 180 | 7 | 525 | EZN | Example |
| 52 | 50 | 10 | 760 | 180 | 7 | 525 | EZN | Example |
| 53 | 50 | 10 | 760 | 180 | 7 | 525 | EZN | Example |
| 54 | 50 | 10 | 760 | 180 | 7 | 525 | EZN | Example |
| 55 | 50 | 10 | 760 | 180 | 7 | 525 | GA | Example |
| 56 | 50 | 10 | 760 | 180 | 7 | 525 | GA | Example |
| 57 | 50 | 10 | 760 | 180 | 7 | 525 | GA | Example |
| 58 | 50 | 10 | 760 | 180 | 7 | 525 | GA | Example |
| 59 | 50 | 10 | 760 | 180 | 7 | 525 | GA | Example |
| 60 | 50 | 10 | 760 | 180 | 7 | 525 | GA | Example |
| 61 | 50 | 10 | 760 | 180 | 7 | 525 | GA | Example |
| 62 | 50 | 10 | 760 | 180 | 7 | 525 | GA | Example |
| 63 | 50 | 10 | 760 | 180 | 7 | 525 | GA | Example |
| 64 | 50 | 10 | 760 | 180 | 7 | 525 | GA | Example |
| 65 | 50 | 10 | 760 | 180 | 7 | 525 | GA | Example |
| 66 | 50 | 10 | 780 | 180 | 5 | 525 | GA | Comparative example |
| 67 | 50 | 10 | 850 | 300 | 5 | 525 | GA | Comparative example |

TABLE 2-continued

|    |    |    |     |     |   |     |    |                     |
|----|----|----|-----|-----|---|-----|----|---------------------|
| 68 | 50 | 10 | 850 | 600 | 7 | 525 | GA | Comparative example |
| 69 | 50 | 10 | 850 | 300 | 7 | 525 | GA | Comparative example |
| 70 | 50 | 10 | 830 | 300 | 7 | 525 | GA | Comparative example |
| 71 | 50 | 10 | 760 | 180 | 7 | 525 | GA | Comparative example |
| 72 | 50 | 10 | 760 | 180 | 7 | 525 | GA | Comparative example |
| 73 | 50 | 1  | 830 | 300 | 7 | 525 | GA | Comparative example |
| 74 | 50 | 10 | 600 | 300 | 7 | 525 | GA | Comparative example |
| 75 | 50 | 10 | 950 | 300 | 7 | 525 | GA | Comparative example |
| 76 | 50 | 10 | 830 | 2   | 7 | 525 | GA | Comparative example |
| 77 | 50 | 10 | 800 | 300 | 1 | 525 | GA | Comparative example |
| 78 | 50 | 10 | 850 | 300 | 7 | 700 | GA | Comparative example |
| 79 | 50 | 10 | 830 | 300 | 7 | 525 | GA | Comparative example |
| 80 | 50 | 10 | 830 | 300 | 7 | 525 | GA | Comparative example |
| 81 | 50 | 5  | 800 | 300 | 7 | 525 | GA | Example             |
| 82 | 50 | 10 | 830 | 300 | 7 | 525 | GA | Comparative example |
| 83 | 50 | 10 | 780 | 300 | 7 | 525 | GA | Example             |
| 84 | 50 | 10 | 830 | 300 | 7 | 525 | GA | Comparative example |
| 85 | 50 | 10 | 830 | 300 | 7 | 525 | GA | Comparative example |
| 86 | 50 | 10 | 830 | 300 | 7 | 525 | GA | Example             |
| 87 | 50 | 10 | 830 | 300 | 7 | 525 | GA | Comparative example |
| 88 | 50 | 10 | 830 | 300 | 7 | 525 | GA | Comparative example |

TABLE 3

| | | Hot pressing | | | | | |
|---|---|---|---|---|---|---|---|
| Specimen No. | Steel ID | Heating rate ° C./s | Heating temp. ° C. | Holding time s | Hot pressing temp. ° C. | Cooling rate up to 150° C. ° C./s | Remarks |
| 1  | A | 5 | 900 | 60 | 700 | 100 | Example |
| 2  | B | 5 | 900 | 60 | 700 | 100 | Example |
| 3  | C | 5 | 900 | 60 | 700 | 100 | Example |
| 4  | D | 5 | 900 | 60 | 700 | 100 | Example |
| 5  | E | 5 | 900 | 60 | 700 | 100 | Example |
| 6  | F | 5 | 900 | 60 | 700 | 100 | Example |
| 7  | G | 5 | 900 | 60 | 700 | 100 | Example |
| 8  | H | 5 | 900 | 60 | 700 | 100 | Example |
| 9  | A | 5 | 900 | 60 | 700 | 100 | Example |
| 10 | A | 5 | 900 | 60 | 700 | 100 | Example |
| 11 | A | 5 | 900 | 60 | 700 | 100 | Example |
| 12 | A | 5 | 900 | 60 | 700 | 100 | Example |
| 13 | A | 5 | 900 | 60 | 700 | 100 | Example |
| 14 | A | 5 | 900 | 60 | 700 | 100 | Example |
| 15 | A | 5 | 900 | 60 | 700 | 100 | Example |
| 16 | A | 5 | 900 | 60 | 700 | 100 | Example |
| 17 | A | 5 | 900 | 60 | 700 | 100 | Example |
| 18 | A | 5 | 900 | 60 | 700 | 100 | Example |
| 19 | A | 5 | 900 | 60 | 700 | 100 | Example |
| 20 | A | 5 | 900 | 60 | 700 | 100 | Example |
| 21 | A | 5 | 900 | 60 | 700 | 100 | Example |
| 22 | A | 5 | 900 | 60 | 700 | 100 | Example |
| 23 | A | 5 | 900 | 60 | 700 | 100 | Example |
| 24 | A | 5 | 900 | 60 | 700 | 100 | Example |
| 25 | A | 5 | 900 | 60 | 700 | 100 | Example |
| 26 | A | 5 | 900 | 60 | 700 | 100 | Example |
| 27 | A | 5 | 900 | 60 | 700 | 100 | Example |
| 28 | A | 5 | 900 | 60 | 700 | 100 | Example |
| 29 | A | 5 | 900 | 60 | 700 | 100 | Example |

TABLE 3-continued

|  |  | Hot pressing | | | | | |
|---|---|---|---|---|---|---|---|
| Specimen No. | Steel ID | Heating rate °C./s | Heating temp. °C. | Holding time s | Hot pressing temp. °C. | Cooling rate up to 150° C. °C./s | Remarks |
| 30 | A | 5 | 900 | 60 | 700 | 100 | Example |
| 31 | A | 5 | 900 | 60 | 700 | 100 | Example |
| 32 | B | 5 | 900 | 60 | 700 | 100 | Example |
| 33 | C | 5 | 900 | 60 | 700 | 100 | Example |
| 34 | D | 5 | 900 | 60 | 700 | 100 | Example |
| 35 | E | 5 | 900 | 60 | 700 | 100 | Example |
| 36 | F | 5 | 900 | 60 | 700 | 100 | Example |
| 37 | A | 5 | 900 | 180 | 700 | 100 | Example |
| 38 | B | 5 | 900 | 180 | 700 | 100 | Example |
| 39 | C | 5 | 900 | 180 | 700 | 100 | Example |
| 40 | D | 5 | 900 | 180 | 700 | 100 | Example |
| 41 | E | 5 | 900 | 180 | 700 | 100 | Example |
| 42 | F | 5 | 900 | 180 | 700 | 100 | Example |
| 43 | A | 5 | 900 | 180 | 700 | 100 | Example |
| 44 | B | 5 | 900 | 180 | 700 | 100 | Example |
| 45 | C | 5 | 900 | 180 | 700 | 100 | Example |
| 46 | D | 5 | 900 | 180 | 700 | 100 | Example |
| 47 | E | 5 | 900 | 180 | 700 | 100 | Example |
| 48 | F | 5 | 900 | 180 | 700 | 100 | Example |
| 49 | A | 5 | 900 | 60 | 700 | 100 | Example |
| 50 | B | 5 | 900 | 60 | 700 | 100 | Example |
| 51 | C | 5 | 900 | 60 | 700 | 100 | Example |
| 52 | D | 5 | 900 | 60 | 700 | 100 | Example |
| 53 | E | 5 | 900 | 60 | 700 | 100 | Example |
| 54 | F | 5 | 900 | 60 | 700 | 100 | Example |
| 55 | A | 3 | 900 | 60 | 700 | 100 | Example |
| 56 | A | 90 | 900 | 60 | 700 | 100 | Example |
| 57 | A | 180 | 900 | 60 | 700 | 100 | Example |
| 58 | A | 5 | 830 | 60 | 700 | 100 | Example |
| 59 | A | 5 | 950 | 60 | 700 | 100 | Example |
| 60 | A | 5 | 900 | 5 | 700 | 100 | Example |
| 61 | A | 5 | 900 | 300 | 700 | 100 | Example |
| 62 | A | 5 | 900 | 60 | 650 | 100 | Example |
| 63 | A | 5 | 900 | 60 | 750 | 100 | Example |
| 64 | A | 5 | 900 | 60 | 700 | 50 | Example |
| 65 | A | 5 | 900 | 60 | 700 | 300 | Example |
| 66 | A | 5 | 900 | 60 | 700 | 100 | Comparative example |
| 67 | A | 5 | 900 | 60 | 700 | 100 | Comparative example |
| 68 | A | 5 | 900 | 60 | 700 | 100 | Comparative example |
| 69 | A | 5 | 900 | 60 | 700 | 100 | Comparative example |
| 70 | A | 5 | 900 | 60 | 700 | 100 | Comparative example |
| 71 | A | 5 | 900 | 60 | 700 | 100 | Comparative example |
| 72 | A | 5 | 900 | 60 | 700 | 100 | Comparative example |
| 73 | A | 5 | 900 | 60 | 700 | 100 | Comparative example |
| 74 | B | 5 | 900 | 60 | 700 | 100 | Comparative example |
| 75 | B | 5 | 900 | 60 | 700 | 100 | Comparative example |
| 76 | B | 5 | 900 | 60 | 700 | 100 | Comparative example |
| 77 | B | 5 | 900 | 60 | 700 | 100 | Comparative example |
| 78 | B | 5 | 900 | 60 | 700 | 100 | Comparative example |
| 79 | I | 5 | 900 | 60 | 700 | 100 | Comparative example |
| 80 | J | 5 | 900 | 60 | 700 | 100 | Comparative example |
| 81 | J | 5 | 850 | 60 | 700 | 50 | Example |
| 82 | K | 5 | 900 | 60 | 700 | 100 | Comparative example |
| 83 | K | 5 | 900 | 60 | 700 | 500 | Example |
| 84 | L | 5 | 900 | 60 | 700 | 100 | Comparative example |
| 85 | M | 5 | 900 | 60 | 700 | 100 | Comparative example |
| 86 | N | 5 | 900 | 60 | 700 | 100 | Example |
| 87 | B | 5 | 900 | 60 | 700 | 100 | Comparative example |
| 88 | B | 5 | 900 | 60 | 700 | 100 | Comparative example |

TABLE 4

| | Microstructure of cold-rolled steel sheet | | | | | | | |
|---|---|---|---|---|---|---|---|---|
| | Martensite | | | Ferrite | | | Nb-based precipitates smaller than | Vickers |
| Specimen No. | Volume fraction (%) | Aspect ratio | Average grain size (μm) | Volume fraction (%) | Aspect ratio | Average grain size (μm) | 0.10 μm (counts/ 100 μm²) | hardness Standard deviation |
| 1 | 12 | 1.8 | 2 | 67 | 2.5 | 6 | 46 | 31 |
| 2 | 14 | 1.9 | 3 | 72 | 2.3 | 5 | 40 | 28 |
| 3 | 8 | 1.8 | 2 | 70 | 2.4 | 6 | 38 | 22 |
| 4 | 19 | 1.9 | 3 | 68 | 2.9 | 7 | 54 | 29 |
| 5 | 24 | 1.6 | 3 | 58 | 2.4 | 6 | 41 | 27 |
| 6 | 7 | 1.8 | 2 | 79 | 2.3 | 7 | 37 | 24 |
| 7 | 9 | 1.4 | 2 | 79 | 2.3 | 8 | 42 | 22 |
| 8 | 11 | 1.8 | 2 | 70 | 2.5 | 6 | 33 | 28 |
| 9 | 21 | 1.9 | 3 | 54 | 2.1 | 6 | 31 | 29 |
| 10 | 11 | 1.8 | 2 | 67 | 2.8 | 6 | 31 | 28 |
| 11 | 12 | 1.9 | 3 | 71 | 2.8 | 5 | 40 | 31 |
| 12 | 8 | 1.6 | 1 | 74 | 2.9 | 6 | 43 | 28 |
| 13 | 13 | 1.8 | 2 | 75 | 2.7 | 7 | 43 | 27 |
| 14 | 13 | 2.1 | 2 | 76 | 2.5 | 6 | 39 | 26 |
| 15 | 12 | 1.6 | 2 | 74 | 2.3 | 6 | 40 | 23 |
| 16 | 18 | 1.8 | 3 | 62 | 2.3 | 7 | 38 | 29 |
| 17 | 25 | 1.4 | 3 | 65 | 2.5 | 6 | 42 | 28 |
| 18 | 19 | 1.8 | 2 | 60 | 2.1 | 7 | 37 | 25 |
| 19 | 10 | 1.9 | 2 | 80 | 2.8 | 8 | 37 | 24 |
| 20 | 9 | 1.8 | 2 | 70 | 2.8 | 6 | 39 | 28 |
| 21 | 8 | 1.9 | 3 | 75 | 2.9 | 6 | 31 | 27 |
| 22 | 11 | 1.6 | 2 | 67 | 2.7 | 6 | 40 | 24 |
| 23 | 13 | 1.8 | 3 | 78 | 2.5 | 5 | 43 | 25 |
| 24 | 7 | 2.1 | 2 | 67 | 2.3 | 6 | 43 | 28 |
| 25 | 62 | 1.6 | 2 | 25 | 2.3 | 4 | 39 | 29 |
| 26 | 12 | 1.8 | 2 | 80 | 2.5 | 7 | 40 | 27 |
| 27 | 14 | 1.5 | 3 | 76 | 2.1 | 6 | 43 | 24 |
| 28 | 16 | 1.7 | 2 | 80 | 2.3 | 6 | 39 | 22 |
| 29 | 12 | 1.9 | 3 | 76 | 2.4 | 7 | 40 | 28 |
| 30 | 21 | 1.8 | 3 | 70 | 2.9 | 6 | 38 | 29 |
| 31 | 15 | 2.1 | 2 | 76 | 2.4 | 7 | 42 | 31 |
| 32 | 15 | 1.6 | 2 | 74 | 2.3 | 6 | 37 | 29 |
| 33 | 21 | 1.8 | 2 | 67 | 2.3 | 7 | 37 | 28 |
| 34 | 20 | 1.5 | 3 | 69 | 2.5 | 8 | 39 | 27 |
| 35 | 14 | 1.8 | 3 | 77 | 2.1 | 6 | 31 | 26 |
| 36 | 12 | 1.5 | 2 | 65 | 2.3 | 7 | 40 | 23 |
| 37 | 14 | 1.7 | 2 | 69 | 2.5 | 8 | 37 | 29 |
| 38 | 13 | 1.9 | 2 | 70 | 2.1 | 6 | 37 | 28 |
| 39 | 15 | 1.8 | 3 | 68 | 2.3 | 6 | 39 | 27 |
| 40 | 16 | 2.1 | 2 | 64 | 2.4 | 6 | 31 | 31 |
| 41 | 17 | 1.4 | 3 | 68 | 2.9 | 5 | 40 | 23 |
| 42 | 18 | 1.8 | 3 | 69 | 2.4 | 6 | 43 | 29 |
| 43 | 19 | 1.9 | 2 | 64 | 2.3 | 7 | 43 | 28 |
| 44 | 21 | 1.8 | 2 | 69 | 2.5 | 6 | 39 | 25 |
| 45 | 18 | 1.9 | 2 | 70 | 2.3 | 6 | 40 | 24 |
| 46 | 9 | 1.6 | 3 | 80 | 2.3 | 7 | 43 | 28 |
| 47 | 12 | 1.7 | 3 | 69 | 2.5 | 6 | 39 | 27 |
| 48 | 18 | 1.9 | 2 | 70 | 2.1 | 7 | 40 | 24 |
| 49 | 14 | 1.8 | 2 | 71 | 2.8 | 6 | 41 | 25 |
| 50 | 15 | 2.1 | 2 | 73 | 2.8 | 7 | 37 | 28 |
| 51 | 19 | 1.4 | 3 | 69 | 2.9 | 6 | 42 | 29 |
| 52 | 19 | 1.8 | 3 | 64 | 2.7 | 7 | 33 | 27 |
| 53 | 9 | 1.9 | 1 | 80 | 2.4 | 8 | 31 | 24 |
| 54 | 19 | 1.6 | 2 | 79 | 2.9 | 5 | 31 | 29 |
| 55 | 20 | 1.8 | 2 | 70 | 2.4 | 5 | 40 | 28 |
| 56 | 20 | 2.1 | 3 | 65 | 2.3 | 4 | 37 | 29 |
| 57 | 12 | 1.6 | 2 | 68 | 2.5 | 6 | 37 | 28 |
| 58 | 13 | 1.8 | 2 | 78 | 2.3 | 6 | 39 | 27 |
| 59 | 14 | 1.5 | 2 | 70 | 2.3 | 6 | 31 | 26 |
| 60 | 15 | 1.7 | 3 | 76 | 2.5 | 6 | 40 | 23 |
| 61 | 14 | 1.9 | 3 | 78 | 2.4 | 7 | 37 | 29 |
| 62 | 13 | 1.8 | 2 | 68 | 2.3 | 8 | 37 | 28 |
| 63 | 13 | 1.5 | 2 | 67 | 2.5 | 6 | 39 | 27 |
| 64 | 14 | 1.9 | 2 | 68 | 2.3 | 7 | 31 | 26 |
| 65 | 16 | 1.6 | 2 | 69 | 2.3 | 8 | 44 | 31 |
| 66 | 16 | 2.8 | 4 | 59 | 2.5 | 6 | 36 | 41 |
| 67 | 19 | 3.1 | 4 | 68 | 2.4 | 5 | 17 | 51 |
| 68 | 18 | 3.3 | 4 | 67 | 3.1 | 6 | 19 | 49 |
| 69 | 11 | 2.4 | 4 | 65 | 2.2 | 7 | 21 | 31 |
| 70 | 17 | 3.2 | 5 | 61 | 2.8 | 6 | 18 | 45 |

TABLE 4-continued

| 71 | 10 | 2.7 | <u>4</u> | 67 | 2.4 | 6 | <u>28</u> | <u>51</u> |
|---|---|---|---|---|---|---|---|---|
| 72 | 10 | 2.9 | <u>5</u> | 64 | 2.3 | 7 | <u>4</u> | 28 |
| 73 | 16 | 2.2 | <u>4</u> | 68 | 2.8 | 6 | <u>22</u> | <u>38</u> |
| 74 | <u>0</u> | — | — | 88 | 3.5 | 5 | 31 | <u>61</u> |
| 75 | 59 | <u>3.1</u> | <u>6</u> | 24 | 3.4 | 6 | <u>27</u> | <u>45</u> |
| 76 | <u>4</u> | 1.3 | 1 | 85 | 2.3 | 6 | <u>22</u> | <u>49</u> |
| 77 | <u>3</u> | 1.4 | 2 | 84 | 2.4 | 7 | <u>19</u> | <u>49</u> |
| 78 | <u>4</u> | 2.3 | 2 | 83 | 2.1 | 6 | <u>24</u> | <u>51</u> |
| 79 | <u>4</u> | 1.9 | 2 | 84 | 2.5 | 6 | 39 | 34 |
| 80 | 29 | 2.4 | <u>4</u> | 54 | 2.3 | 7 | 34 | <u>39</u> |
| 81 | 5 | 2.1 | 3 | 86 | 2.8 | 7 | 29 | 35 |
| 82 | <u>4</u> | 1.5 | 2 | 81 | 2.4 | 6 | 34 | 28 |
| 83 | 29 | 2.3 | 2 | 55 | 2.6 | 7 | 30 | 31 |
| 84 | 24 | <u>3.4</u> | <u>5</u> | 65 | 2.8 | 6 | 32 | <u>69</u> |
| 85 | 18 | 1.7 | <u>4</u> | 69 | 2.2 | 6 | <u>26</u> | <u>40</u> |
| 86 | 14 | 1.8 | 3 | 71 | 2.1 | 6 | 35 | 24 |
| 87 | 15 | <u>3.2</u> | <u>6</u> | 80 | 3.4 | 8 | <u>8</u> | <u>55</u> |
| 88 | 17 | <u>3.4</u> | <u>4</u> | 78 | 3.6 | 7 | <u>12</u> | <u>67</u> |

| | Microstructure of hot-pressed member | | | | |
|---|---|---|---|---|---|
| | Martensite | Prior austenite | | Nb-based precipitates smaller than | Vickers | |
| Specimen No. | Volume fraction (%) | Average grain size (μm) | Aspect ratio | 0.10 μm (counts/100 μm$^2$) | hardness Standard deviation | Remarks |
| 1 | 98 | 6 | 2.5 | 41 | 25 | Example |
| 2 | 100 | 5 | 2.4 | 35 | 34 | Example |
| 3 | 99 | 6 | 2.5 | 33 | 28 | Example |
| 4 | 97 | 7 | 2.1 | 49 | 34 | Example |
| 5 | 95 | 6 | 1.9 | 38 | 24 | Example |
| 6 | 97 | 6 | 2.5 | 33 | 28 | Example |
| 7 | 99 | 6 | 2.2 | 32 | 23 | Example |
| 8 | 99 | 6 | 2.1 | 37 | 23 | Example |
| 9 | 98 | 6 | 2.3 | 34 | 30 | Example |
| 10 | 98 | 5 | 2.3 | 36 | 25 | Example |
| 11 | 99 | 6 | 2.1 | 39 | 26 | Example |
| 12 | 100 | 6 | 2.4 | 40 | 25 | Example |
| 13 | 99 | 5 | 2.3 | 32 | 30 | Example |
| 14 | 100 | 6 | 2.5 | 31 | 31 | Example |
| 15 | 99 | 7 | 2.5 | 34 | 34 | Example |
| 16 | 99 | 7 | 2.4 | 40 | 33 | Example |
| 17 | 98 | 7 | 2.3 | 49 | 32 | Example |
| 18 | 98 | 5 | 2.3 | 38 | 33 | Example |
| 19 | 96 | 7 | 2.4 | 33 | 34 | Example |
| 20 | 96 | 6 | 2.3 | 32 | 30 | Example |
| 21 | 99 | 6 | 2.2 | 37 | 29 | Example |
| 22 | 99 | 7 | 1.9 | 34 | 28 | Example |
| 23 | 98 | 6 | 2.5 | 37 | 23 | Example |
| 24 | 98 | 7 | 2.2 | 34 | 31 | Example |
| 25 | 99 | 7 | 2.1 | 36 | 23 | Example |
| 26 | 100 | 5 | 2.3 | 32 | 30 | Example |
| 27 | 99 | 6 | 2.3 | 37 | 25 | Example |
| 28 | 100 | 7 | 2.1 | 34 | 26 | Example |
| 29 | 99 | 6 | 2.4 | 36 | 25 | Example |
| 30 | 99 | 6 | 2.3 | 39 | 30 | Example |
| 31 | 98 | 6 | 2.3 | 49 | 31 | Example |
| 32 | 98 | 7 | 2.3 | 38 | 29 | Example |
| 33 | 96 | 7 | 2.1 | 33 | 28 | Example |
| 34 | 98 | 7 | 2.4 | 32 | 23 | Example |
| 35 | 96 | 5 | 2.3 | 37 | 31 | Example |
| 36 | 96 | 7 | 2.5 | 34 | 23 | Example |
| 37 | 99 | 6 | 2.5 | 37 | 25 | Example |
| 38 | 99 | 6 | 2.4 | 34 | 30 | Example |
| 39 | 98 | 7 | 2.3 | 32 | 31 | Example |
| 40 | 98 | 6 | 2.3 | 37 | 29 | Example |
| 41 | 99 | 7 | 2.4 | 34 | 28 | Example |
| 42 | 100 | 7 | 2.3 | 36 | 23 | Example |
| 43 | 99 | 5 | 2.2 | 39 | 31 | Example |
| 44 | 98 | 6 | 1.9 | 34 | 23 | Example |
| 45 | 98 | 7 | 2.5 | 36 | 25 | Example |
| 46 | 96 | 6 | 2.2 | 39 | 30 | Example |
| 47 | 98 | 7 | 2.1 | 40 | 31 | Example |
| 48 | 96 | 6 | 2.3 | 32 | 34 | Example |
| 49 | 96 | 6 | 2.2 | 31 | 33 | Example |
| 50 | 99 | 6 | 1.9 | 34 | 31 | Example |
| 51 | 98 | 7 | 2.5 | 40 | 29 | Example |

TABLE 4-continued

| | | | | | | |
|---|---|---|---|---|---|---|
| 52 | 96 | 7 | 2.2 | 34 | 28 | Example |
| 53 | 96 | 7 | 2.1 | 32 | 23 | Example |
| 54 | 99 | 5 | 2.3 | 37 | 25 | Example |
| 55 | 99 | 7 | 2.3 | 34 | 30 | Example |
| 56 | 98 | 6 | 2.5 | 36 | 31 | Example |
| 57 | 98 | 6 | 2.5 | 33 | 29 | Example |
| 58 | 99 | 7 | 2.2 | 32 | 30 | Example |
| 59 | 100 | 7 | 2.1 | 33 | 31 | Example |
| 60 | 99 | 7 | 2.3 | 32 | 29 | Example |
| 61 | 100 | 7 | 2.2 | 37 | 31 | Example |
| 62 | 96 | 5 | 1.9 | 34 | 29 | Example |
| 63 | 99 | 7 | 2.5 | 37 | 31 | Example |
| 64 | 99 | 6 | 2.2 | 34 | 29 | Example |
| 65 | 98 | 6 | 2.1 | 36 | 30 | Example |
| 66 | 94 | <u>9</u> | <u>3.1</u> | 32 | <u>54</u> | Comparative example |
| 67 | 95 | 8 | 2.4 | <u>12</u> | <u>49</u> | Comparative example |
| 68 | 99 | 8 | 2.8 | <u>8</u> | <u>61</u> | Comparative example |
| 69 | 97 | 7 | 2.5 | <u>13</u> | 40 | Comparative example |
| 70 | 96 | 7 | 2.4 | <u>10</u> | <u>58</u> | Comparative example |
| 71 | 98 | 7 | 2.4 | 25 | <u>61</u> | Comparative example |
| 72 | 98 | <u>9</u> | 2.6 | <u>4</u> | <u>41</u> | Comparative example |
| 73 | 98 | <u>9</u> | 2.8 | <u>15</u> | <u>42</u> | Comparative example |
| 74 | 94 | <u>9</u> | 2.4 | 26 | <u>55</u> | Comparative example |
| 75 | 96 | <u>10</u> | <u>3.3</u> | <u>11</u> | <u>56</u> | Comparative example |
| 76 | 98 | 8 | 2.4 | <u>16</u> | <u>61</u> | Comparative example |
| 77 | 97 | <u>9</u> | 2.5 | <u>13</u> | <u>61</u> | Comparative example |
| 78 | 98 | 7 | 2.6 | <u>16</u> | <u>54</u> | Comparative example |
| 79 | 98 | 5 | 2.4 | 22 | 38 | Comparative example |
| 80 | 99 | 7 | 2.2 | 24 | <u>45</u> | Comparative example |
| 81 | 99 | 8 | 2.5 | 20 | 39 | Example |
| 82 | <u>84</u> | 6 | 2.6 | 24 | 22 | Comparative example |
| 83 | 99 | 7 | 2.4 | 20 | 38 | Example |
| 84 | 98 | 6 | <u>3.1</u> | 24 | <u>78</u> | Comparative example |
| 85 | 98 | 6 | 2.6 | <u>19</u> | <u>41</u> | Comparative example |
| 86 | 98 | 6 | 1.9 | 41 | 28 | Example |
| 87 | 99 | <u>9</u> | <u>3.6</u> | <u>5</u> | <u>58</u> | Comparative example |
| 88 | 98 | 9 | <u>3.3</u> | <u>8</u> | <u>55</u> | Comparative example |

Underlined if outside the range of the disclosure.

TABLE 5

| Specimen No. | Tensile strength TS (MPa) | Delayed fracture resistance | Tensile shear stress | Remarks |
|---|---|---|---|---|
| 1 | 1830 | Good | Good | Example |
| 2 | 1881 | Good | Good | Example |
| 3 | 2054 | Good | Good | Example |
| 4 | 1854 | Good | Good | Example |
| 5 | 1864 | Good | Good | Example |
| 6 | 1801 | Good | Good | Example |
| 7 | 1821 | Good | Good | Example |
| 8 | 1810 | Good | Good | Example |
| 9 | 1812 | Good | Good | Example |
| 10 | 1823 | Good | Good | Example |
| 11 | 1835 | Good | Good | Example |
| 12 | 1843 | Good | Good | Example |
| 13 | 1819 | Good | Good | Example |
| 14 | 1810 | Good | Good | Example |
| 15 | 1790 | Good | Good | Example |
| 16 | 1799 | Good | Good | Example |
| 17 | 1811 | Good | Good | Example |
| 18 | 1843 | Good | Good | Example |
| 19 | 1822 | Good | Good | Example |
| 20 | 1819 | Good | Good | Example |
| 21 | 1843 | Good | Good | Example |
| 22 | 1833 | Good | Good | Example |
| 23 | 1829 | Good | Good | Example |
| 24 | 1803 | Good | Good | Example |
| 25 | 1833 | Good | Good | Example |
| 26 | 1824 | Good | Good | Example |
| 27 | 1843 | Good | Good | Example |
| 28 | 1833 | Good | Good | Example |
| 29 | 1819 | Good | Good | Example |
| 30 | 1830 | Good | Good | Example |
| 31 | 1849 | Good | Good | Example |
| 32 | 1842 | Good | Good | Example |
| 33 | 1837 | Good | Good | Example |
| 34 | 1833 | Good | Good | Example |
| 35 | 1820 | Good | Good | Example |
| 36 | 1808 | Good | Good | Example |
| 37 | 1798 | Good | Good | Example |
| 38 | 1812 | Good | Good | Example |
| 39 | 1822 | Good | Good | Example |
| 40 | 1829 | Good | Good | Example |
| 41 | 1831 | Good | Good | Example |
| 42 | 1922 | Good | Good | Example |
| 43 | 1833 | Good | Good | Example |
| 44 | 1832 | Good | Good | Example |
| 45 | 1820 | Good | Good | Example |
| 46 | 1855 | Good | Good | Example |
| 47 | 1892 | Good | Good | Example |
| 48 | 1889 | Good | Good | Example |
| 49 | 1854 | Good | Good | Example |
| 50 | 1834 | Good | Good | Example |
| 51 | 1844 | Good | Good | Example |
| 52 | 1840 | Good | Good | Example |
| 53 | 1829 | Good | Good | Example |
| 54 | 1844 | Good | Good | Example |
| 55 | 1839 | Good | Good | Example |
| 56 | 1841 | Good | Good | Example |
| 57 | 1829 | Good | Good | Example |
| 58 | 1854 | Good | Good | Example |
| 59 | 1866 | Good | Good | Example |
| 60 | 1839 | Good | Good | Example |
| 61 | 1832 | Good | Good | Example |
| 62 | 1822 | Good | Good | Example |
| 63 | 1820 | Good | Good | Example |
| 64 | 1854 | Good | Good | Example |

TABLE 5-continued

| Specimen No. | Tensile strength TS (MPa) | Delayed fracture resistance | Tensile shear stress | Remarks |
|---|---|---|---|---|
| 65 | 1867 | Good | Good | Example |
| 66 | 1833 | Poor | Fair | Comparative example |
| 67 | 1855 | Poor | Poor | Comparative example |
| 68 | 1844 | Poor | Poor | Comparative example |
| 69 | 1833 | Poor | Poor | Comparative example |
| 70 | 1846 | Poor | Poor | Comparative example |
| 71 | 1811 | Poor | Poor | Comparative example |
| 72 | 1842 | Poor | Poor | Comparative example |
| 73 | 1841 | Poor | Poor | Comparative example |
| 74 | 1849 | Poor | Good | Comparative example |
| 75 | 1914 | Poor | Poor | Comparative example |
| 76 | 1844 | Poor | Poor | Comparative example |
| 77 | 1894 | Poor | Poor | Comparative example |
| 78 | 1944 | Poor | Poor | Comparative example |
| 79 | <u>1588</u> | Good | Fair | Comparative example |
| 80 | 2433 | Poor | Poor | Comparative example |
| 81 | 1821 | Fair | Good | Example |
| 82 | <u>1541</u> | Good | Poor | Comparative example |
| 83 | 1790 | Good | Fair | Example |
| 84 | 1884 | Poor | Poor | Comparative example |
| 85 | 1810 | Poor | Poor | Comparative example |
| 86 | 1823 | Good | Good | Example |
| 87 | 1833 | Poor | Poor | Comparative example |
| 88 | 1842 | Poor | Poor | Comparative example |

Underlined if outside the range of the disclosure.

As can be seen from Table 5, all of our examples in which the chemical compositions and the microstructures of hot-pressed members satisfy the appropriate ranges of the present disclosure have excellent delayed fracture resistance and high tensile shear stress after resistance spot welding, not to mention high tensile strength.

The invention claimed is:

1. A cold-rolled steel sheet for hot pressing, comprising:
a chemical composition containing, by mass %, C: 0.28% or more and less than 0.42%, Si: 1.5% or less, Mn: 1.1% or more and 2.4% or less, P: 0.05% or less, S: 0.005% or less, Al: 0.01% or more and 0.50% or less, N: 0.010% or less, and Nb: 0.005% or more and 0.15% or less, and optionally at least one element selected from the group consisting of Ti: 0.15% or less, B: 0.0050% or less, Mo: 0.50% or less, Cr: 0.50% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less, with the balance being Fe and inevitable impurities,
a microstructure which contains 5% or more by volume fraction of martensite having an average aspect ratio of 3.0 or less and an average grain size of 3 μm or less, and at least 30 Nb-based precipitates having a grain size of less than 0.10 μm present on average per 100 μm$^2$ of a cross section parallel to a thickness direction of the steel sheet; and
a standard deviation of Vickers hardness measured at a test force of 300 g every 200 μm on a surface of the steel sheet of 35 or less.

2. The cold-rolled steel sheet for hot pressing according to claim 1, wherein the chemical composition contains, by mass%, at least one selected from Ti: 0.15% or less, B: 0.0050% or less, Mo: 0.50% or less, Cr: 0.50% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

3. The cold-rolled steel sheet for hot pressing according to claim 2, wherein the steel sheet comprises on a surface thereof an Al or Al alloy coating or plating layer or a Zn or Zn alloy coating or plating layer.

4. The cold-rolled steel sheet for hot pressing according to claim 1, wherein the steel sheet comprises on a surface thereof an Al or Al alloy coating or plating layer or a Zn or Zn alloy coating or plating layer.

5. A method for manufacturing the cold-rolled steel sheet for hot pressing as recited in claim 1, the method comprising:
preparing a steel raw material comprising a chemical composition containing, by mass %, C: 0.28% or more and less than 0.42%, Si: 1.5% or less, Mn: 1.1% or more and 2.4% or less, P: 0.05% or less, S: 0.005% or less, Al: 0.01% or more and 0.50% or less, N: 0.010% or less, and Nb: 0.005% or more and 0.15% or less, and optionally at least one element selected from the group consisting of Ti: 0.15% or less, B: 0.0050% or less, Mo: 0.50% or less, Cr: 0.50% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less, with the balance being Fe and inevitable impurities;
hot rolling the steel raw material to obtain a hot-rolled steel sheet under a set of conditions including a rolling reduction of 12% or more at a final pass of finish rolling, a rolling reduction of 15% or more at a pass immediately before the final pass, and a finisher delivery temperature of 860° C. to 950° C.;
after the hot rolling, subjecting the hot-rolled steel sheet to primary cooling whereby the hot-rolled steel sheet is cooled to a cooling end temperature of 700° C. or lower at a first average cooling rate of 70° C./s or higher up to the cooling end temperature;
after the primary cooling, subjecting the steel sheet to secondary cooling whereby the steel sheet is coiled at a coiling temperature of 520° C. or lower at a second average cooling rate of 5° C./s to 50° C./s up to the coiling temperature;
then pickling the coiled hot-rolled steel sheet, and then subjecting the steel sheet to a first heat treatment whereby the steel sheet is heated to a temperature range of 400° C. to 700° C.;
then cold rolling the steel sheet to obtain a cold-rolled steel sheet, then subjecting the cold-rolled steel sheet to a second heat treatment whereby the cold-rolled steel sheet is heated to a temperature range of 720° C. to 850° C. at an average heating rate of 5° C./s to 20° C./s and subjected to 15 seconds to 600 seconds of soaking in the temperature range of 720° C. to 850° C.; and
after the soaking, subjecting the cold-rolled steel sheet to a tertiary cooling whereby the cold-rolled steel sheet is cooled to a cooling end temperature of 600° C. or lower at a third average cooling rate of 5° C./s or higher.

6. The method according to claim 5, wherein
the chemical composition contains, by mass %, at least one selected from the group consisting of Ti: 0.15% or less, B: 0.0050% or less, Mo: 0.50% or less, Cr: 0.50% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

7. The method according to claim 5, the method further comprising:
after the tertiary cooling, applying an Al or Al alloy coating or plating treatment or a Zn or Zn alloy coating or plating treatment to a surface of the cold-rolled steel sheet.

8. The method according to claim 6, the method further comprising:
after the tertiary cooling, applying an Al or Al alloy coating or plating treatment or a Zn or Zn alloy coating or plating treatment to a surface of the cold-rolled steel sheet.

9. A method for manufacturing a hot-pressed member, comprising:
heating the cold-rolled steel sheet for hot pressing as recited in claim 1 in a temperature range of an $Ac_3$ transformation temperature to 1000° C.; and
then hot pressing the steel sheet.

10. The method for manufacturing a hot-pressed member according to claim 9, wherein the chemical composition contains, by mass %, at least one selected from the group consisting of Ti: 0.15% or less, B: 0.0050% or less, Mo: 0.50% or less, Cr: 0.50% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

11. The method for manufacturing a hot-pressed member according to claim 10, wherein the steel sheet comprises on a surface thereof an Al or Al alloy coating or plating layer or a Zn or Zn alloy coating or plating layer.

12. The method for manufacturing a hot-pressed member according to claim 9,
wherein the steel sheet comprises on a surface thereof an Al or Al alloy coating or plating layer or a Zn or Zn alloy coating or plating layer.

* * * * *